US012335637B2

(12) United States Patent
Basu

(10) Patent No.: US 12,335,637 B2
(45) Date of Patent: Jun. 17, 2025

(54) NON-PLANAR LENTICULAR ARRAYS FOR LIGHT FIELD IMAGE CAPTURE

(71) Applicant: Adeia Imaging LLC, San Jose, CA (US)

(72) Inventor: Anup Basu, Saint Albert (CA)

(73) Assignee: Adeia Imaging LLC, San Jose, CA (US)

( * ) Notice: Subject to any disclaimer, the term of this patent is extended or adjusted under 35 U.S.C. 154(b) by 400 days.

(21) Appl. No.: 18/101,184

(22) Filed: Jan. 25, 2023

(65) Prior Publication Data
US 2024/0251175 A1    Jul. 25, 2024

(51) Int. Cl.
*H04N 23/957* (2023.01)
*G02B 3/00* (2006.01)
*G03B 13/18* (2021.01)
*H04N 23/60* (2023.01)
*H04N 23/958* (2023.01)

(52) U.S. Cl.
CPC .......... *H04N 23/957* (2023.01); *G02B 3/005* (2013.01); *G03B 13/18* (2013.01); *H04N 23/64* (2023.01); *H04N 23/958* (2023.01)

(58) Field of Classification Search
None
See application file for complete search history.

(56) References Cited

U.S. PATENT DOCUMENTS

| | | | |
|---|---|---|---|
| 4,708,438 | A | 11/1987 | Larussa et al. |
| 6,795,250 | B2 | 9/2004 | Johnson et al. |
| 7,609,450 | B2 | 10/2009 | Niemuth |
| 7,965,936 | B2 | 6/2011 | Raskar et al. |
| 8,049,772 | B2 | 11/2011 | Lipton et al. |
| 8,400,555 | B1 | 3/2013 | Georgiev et al. |
| 8,520,153 | B2 | 8/2013 | Kao et al. |
| 8,717,489 | B2 | 5/2014 | Ng et al. |

(Continued)

FOREIGN PATENT DOCUMENTS

JP    2017-207695 A    11/2017

OTHER PUBLICATIONS

Raytrix—3D Light-Field Cameras with 4D Plenoptic RGB-Depth Express Sensors, retrieved at https://raytrix.de/products/ on Apr. 12, 2023.

(Continued)

*Primary Examiner* — Quan Pham
(74) *Attorney, Agent, or Firm* — HALEY GUILIANO LLP

(57) ABSTRACT

Systems, methods, and apparatuses are provided herein for changing the positions and/or shapes of microlenses of a light field camera to generate light field images with enhanced depth of field and/or dynamic range. This may be accomplished by a light field camera determining a plurality of focus measurements for a plurality of microlenses, wherein one or more of the plurality of microlenses vary in distance from a main lens of the light field camera. The light field camera may use the plurality of focus measurements to determine a microlens of the plurality of microlenses that captures information that is the most focused. The light field camera can then determine defocus functions for the microlenses that are not capturing information that is the most focused. The light field camera can then generate a light field image using the determined defocus functions and the information captured by the plurality of microlenses.

20 Claims, 23 Drawing Sheets

(56) References Cited

U.S. PATENT DOCUMENTS

| | | | |
|---|---|---|---|
| 8,998,411 | B2 | 4/2015 | Tumlinson et al. |
| 9,380,221 | B2 | 6/2016 | Marwah et al. |
| 11,454,798 | B2 | 9/2022 | Kleppe et al. |
| 2008/0208506 | A1 | 8/2008 | Kuwata |
| 2011/0129165 | A1 | 6/2011 | Lim et al. |
| 2012/0099199 | A1 | 4/2012 | Vasylyev |
| 2013/0222676 | A1* | 8/2013 | Ono ................. G03B 13/32 348/345 |
| 2013/0242161 | A1* | 9/2013 | Kobayashi ........ H04N 23/957 348/340 |
| 2014/0285693 | A1 | 9/2014 | Kobayashi et al. |
| 2014/0340745 | A1 | 11/2014 | Gibilisco et al. |
| 2016/0182786 | A1 | 6/2016 | Anderson et al. |
| 2016/0191768 | A1 | 6/2016 | Shin et al. |
| 2017/0038502 | A1 | 2/2017 | Georgiev |
| 2018/0180836 | A1 | 6/2018 | Huang |
| 2019/0107688 | A1 | 4/2019 | Nakajima |
| 2019/0236796 | A1 | 8/2019 | Blasco et al. |
| 2020/0077015 | A1 | 3/2020 | Watanabe et al. |
| 2020/0128188 | A1 | 4/2020 | Iwasaki et al. |
| 2021/0141205 | A1 | 5/2021 | Kleppe et al. |
| 2023/0020189 | A1 | 1/2023 | Park et al. |
| 2024/0053516 | A1* | 2/2024 | Lee ................... G02B 3/0043 |
| 2024/0251178 | A1 | 7/2024 | Basu |

OTHER PUBLICATIONS

"Science Daily: Researchers use electrically responsive fluid to make eye-like adaptive lens", retrieved at https://www.sciencedaily.com/releases/2022/01/220119155224.htm#, Jan. 19, 2022.

"Vision Systems Design: Adaptive lenses mimic the human eye", retrieved at https://www.vision-systems.com/non-factory/life-sciences/article/16738793/adaptive-lenses-mimic-the-human-eye, Oct. 31, 2007.

Antipa, Nicholas, et al., "Single-Shot Diffuser-Encoded Light Field Imaging", IEEE, 2016.

Bergen, James R., et al., "The Plenoptic Function and the Elements of Early Vision", Computational Models of Visual Processing, 1991, 3-20.

Chen, Chen, et al., "Learning to See in the Dark", retrieved at https://arxiv.org/pdf/1805.01934.pdf, 2018.

Dansereau, Donald G., et al., "A Wide-Field-of-View Monocentric Light Field Camera", Computer Vision Foundation, 2017.

Gershun, Andrei, "The Light Field", Journal of Mathematics and Physics, vol. 18.1-4, 1939, 51-151.

Gortler, Steven J., et al., "The lumigraph", Proceedings of the 23rd Annual Conference on Computer Graphics and Interactive Techniques, 1996.

Gu, Shuhang, et al., "Self-Guided Network for Fast Image Denoising", Proceedings of the IEEE/CVF International Conference on Computer Vision, 2019.

Guo, Xiaojie, et al., "LIME: Low-light Image Enhancement via Illumination Map Estimation", IEEE Transactions on Image Processing, 26.2, 2016.

Jia, Chen, et al., "Identification of Pedestrians from Confused Planar Objects Using Light Field Imaging", IEEE Access, vol. 6, 2018, 39375-39384.

Kalantari, Nima Khademi, et al., "Learning-Based View Synthesis for Light Field Cameras", ACM Transactions on Graphics (TOG) 35.6, 2016.

Kamal, Mahdad Hosseini, et al., "Tensor low-rank and sparse light field photography", Computer Vision and Image Understanding, vol. 145, pp. 172-181, 2016.

Koopmans, Steven A., et al., "Relation between injected volume and optical parameters in refilled isolated porcine lenses", Ophthal. Physiol. Opt., 24: 572-579, 2004.

Lamba, Mohit, et al., "Fast and Efficient Restoration of Extremely Dark Light Fields", Proceedings of the IEEE/CVF Winter Conference on Applications of Computer Vision, 2022.

Lamba, Mohit, et al., "Harnessing Multi-View Perspective of Light Fields for Low-Light Imaging", IEEE Transactions on Image Processing, vol. 30, 2021, 1501-1513.

Lee, Chulwoo, et al., "Contrast Enhancement Based on Layered Difference Representation of 2D Histograms", IEEE transactions on image processing 22.12, 2013.

Levoy, Marc, et al., "Light Field Microscopy", ACM Transactions on Graphics 25(3), Proc. SIGGRAPH, 2006.

Levoy, Marc, et al., "Light field rendering", Proceedings of the 23rd Annual Conference on Computer Graphics and Interactive Techniques, 1996, 31-42.

Li, Jinyang, et al., "Defocus Blur Detection and Estimation from Imaging Sensors", Sensors Journal, vol. 18, pp. 1-15, 2018.

Li, Tingtian, et al., "Robust Reflection Removal Based on Light Field Imaging", IEEE Transactions on Image Processing, vol. 28, No. 4, Apr. 2019, 1798-1812.

Lin, Xing, et al., "Camera array based light field microscopy", Biomedical Optics Express, vol. 6, No. 9, 2015, 3179-3189.

Marwah, Kshitij, et al., "Compressive Light Field Photography using Overcomplete Dictionaries and Optimized Projections", ACM Transactions on Graphics, vol. 32, No. 4, Article 46, 2013.

Mechrez, Roey, et al., "The Contextual Loss for Image Transformation with Non-Aligned Data", Proceedings of the European conference on computer vision (ECCV), retrieved at https://arxiv.org/pdf/1803.02077.pdf, 2018.

Meng, Nan, et al., "LightGAN: A Deep Generative Model for Light Field Reconstruction", IEEE Access, vol. 8, 2020.

Nguyen, Cindy M., et al., "Learning Spatially Varying Pixel Exposures for Motion Deblurring", retrieved at https://arxiv.org/pdf/2204.07267.pdf, Apr. 14, 2022.

Rogers, John A., et al., "Materials and Mechanics for Stretchable Electronics", Science vol. 327, pp. 1603-1607, 2010.

Teague, Michael Reed, "Deterministic Phase Retrieval: A Green's Function Solution", J. Opt. Soc. Am., vol. 73, No. 11, Nov. 1983, 1434-1441.

Vargas, Edwin, et al., "Time-Multiplexed Coded Aperture Imaging: Learned Coded Aperture and Pixel Exposures for Compressive Imaging Systems", retrieved at https://arxiv.org/pdf/2104.02820.pdf, Apr. 6, 2021.

Veeraraghavan, Ashok, et al., "Dappled Photography: Mask Enhanced Cameras for Heterodyned Light Fields and Coded Aperture Refocusing", CM Trans. Graph. 26.3, 2007.

Venkataraman, Kartik, et al., "PiCam: An Ultra-Thin High Performance Monolithic Camera Array", ACM Transactions on Graphics, vol. 32, No. 6, Article 166, 2013.

Wei, Chen, et al., "Deep Retinex Decomposition for Low-Light Enhancement", retrieved at https://arxiv.org/pdf/1808.04560.pdf, 2018.

Wei, Li-Yi, et al., "Improving Light Field Camera Sample Design with Irregularity and Aberration", ACM Transactions on Graphics (TOG) 34.4, 2015.

Xu, Miao, et al., "Variable-focus liquid lens based on electrically responsive fluid", Optics Letters, vol. 47, issue 3, pp. 509-512, 2022.

Zhang, Xinxin, et al., "Spatially Variant Defocus Blur Map Estimation and Deblurring from a Single Image", Journal of Visual Communication and Image Representation, vol. 35, 2016, 257-264.

U.S. Appl. No. 18/101,185, filed Jan. 25, 2023, Anup Basu.

* cited by examiner

102
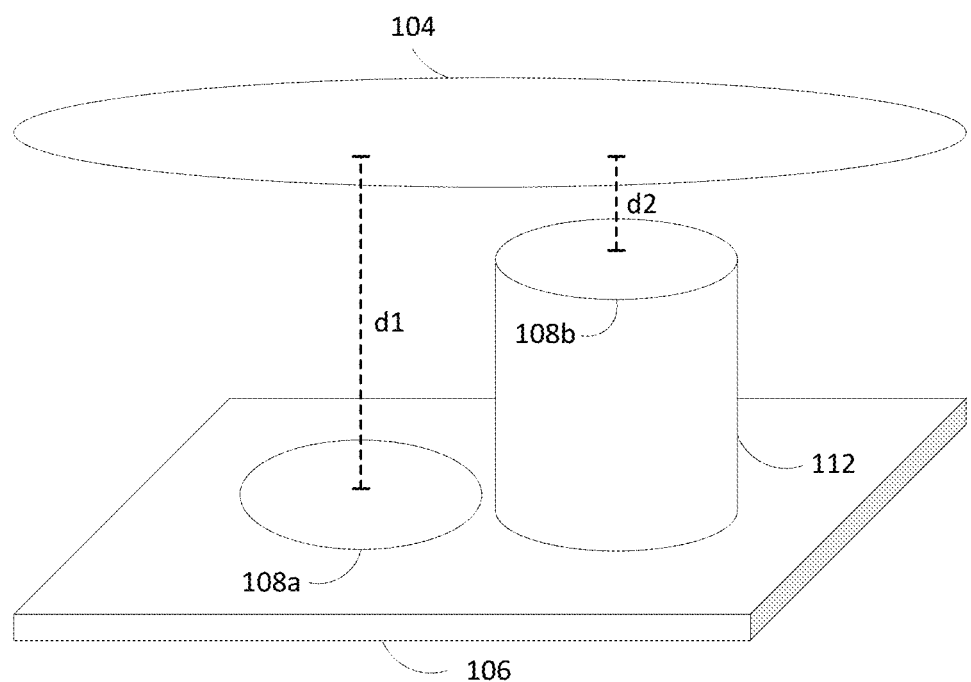
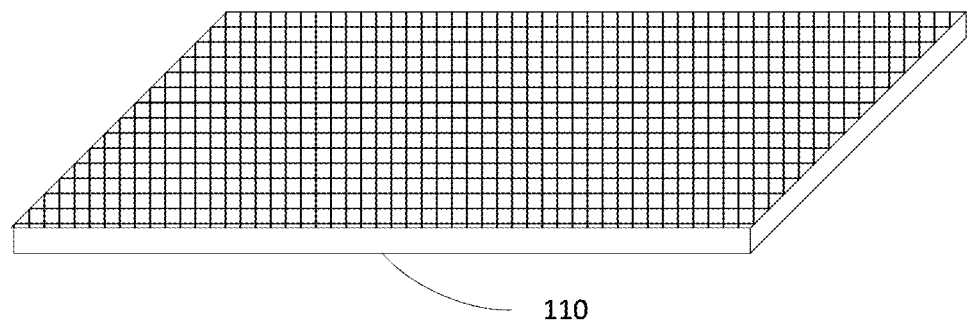
FIG. 1A

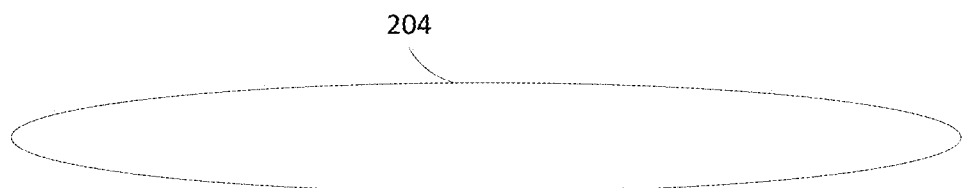
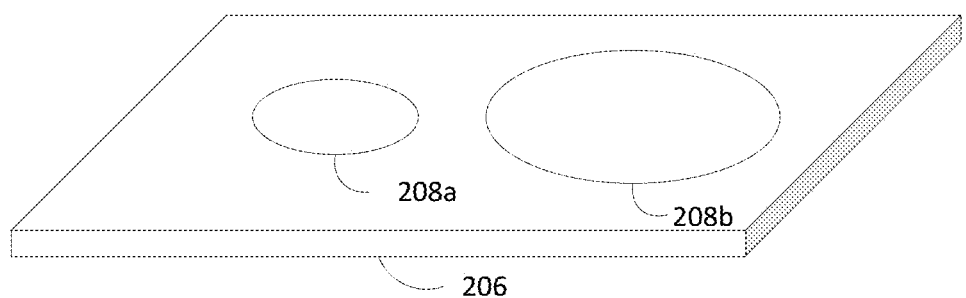
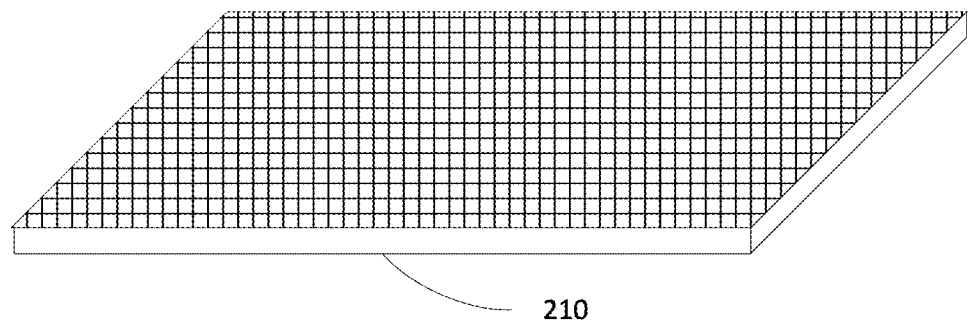
FIG. 2B

302
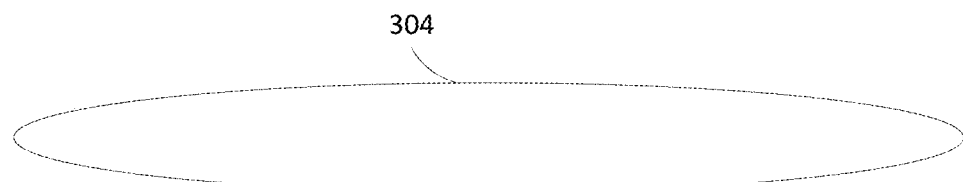
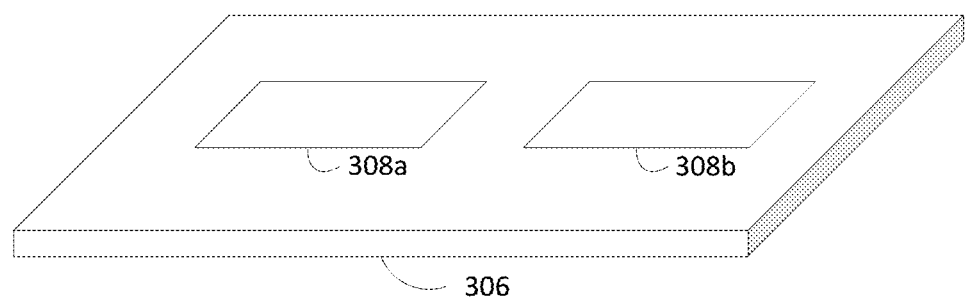
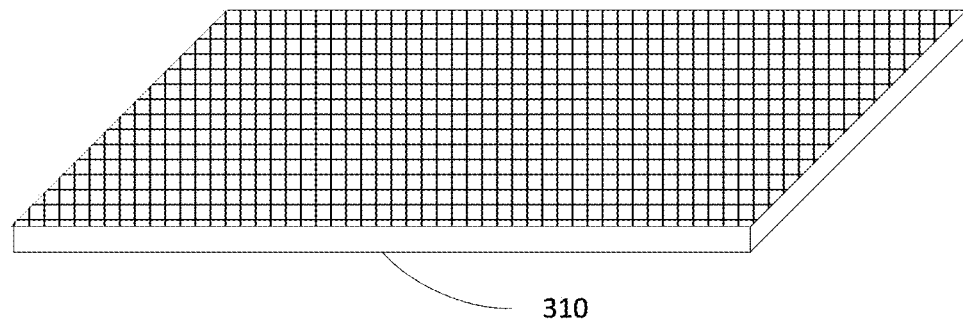
FIG. 3A

302
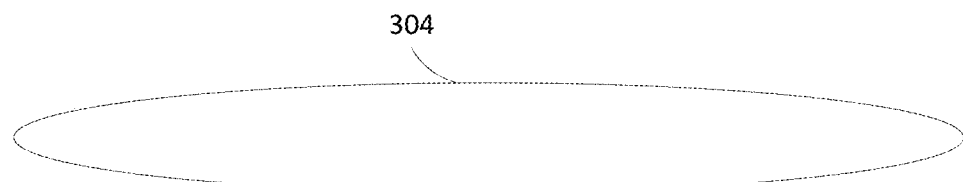
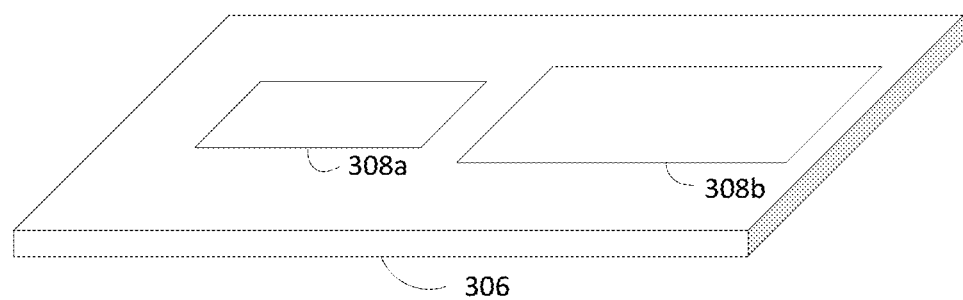
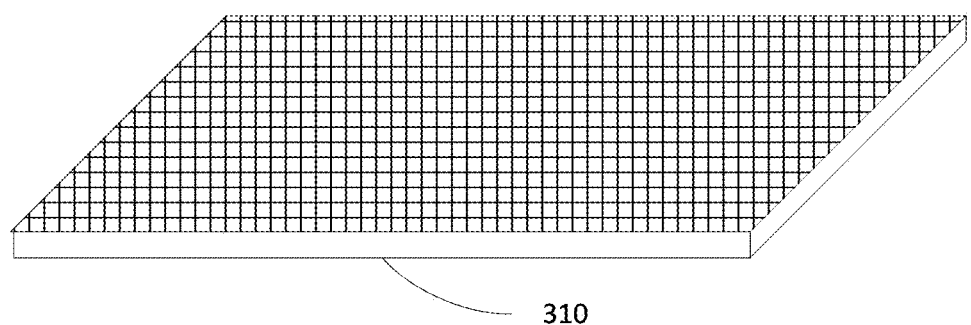
FIG. 3B

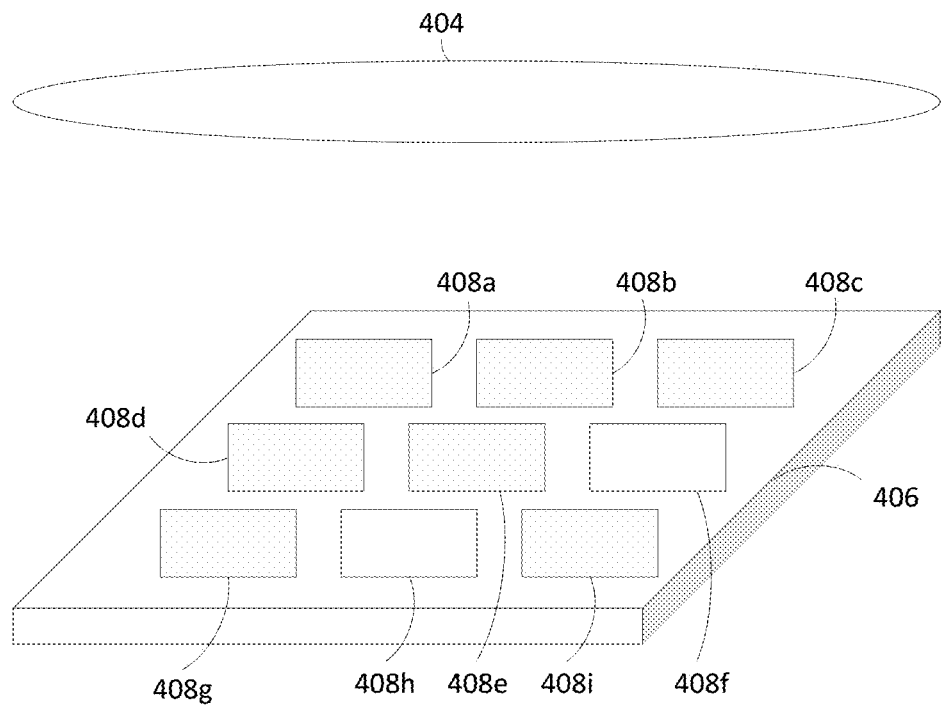
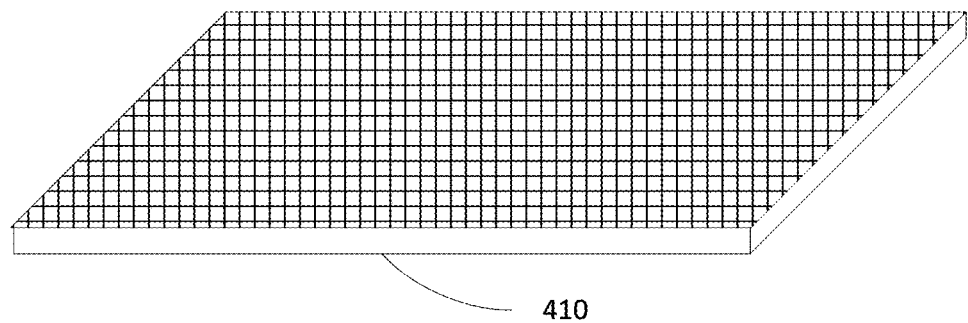
FIG. 4A

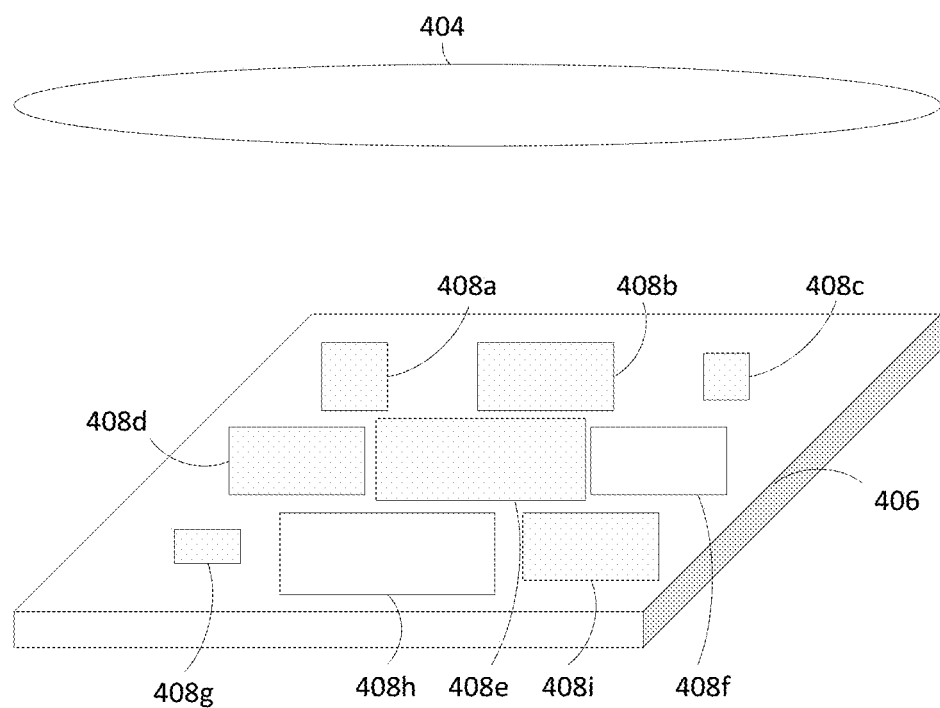
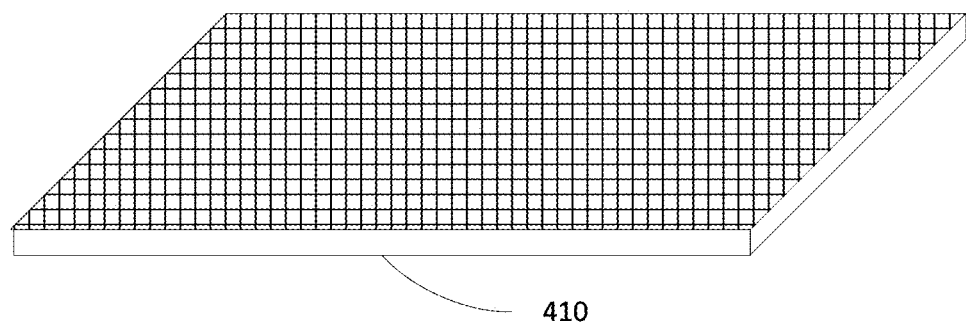
FIG. 4B

1000

```
┌─────────────────────────────────────────────────────┐ 1002
│   Determine a plurality of focus measurements for a │
│   plurality of microlenses, wherein a first microlens of the │
│   plurality of microlenses is a first vertical distance from a │
│   second microlens of the plurality of microlenses  │
└─────────────────────────────────────────────────────┘
                          ↓
┌─────────────────────────────────────────────────────┐ 1004
│  Identify a first focus measurement of the plurality of focus │
│     measurements, wherein the first focus measurement │
│            corresponds to the first microlens       │
└─────────────────────────────────────────────────────┘
                          ↓
┌─────────────────────────────────────────────────────┐ 1006
│      Determine a first defocus function for the second │
│   microlens based on the first vertical distance between the │
│         first microlens and the second microlens    │
└─────────────────────────────────────────────────────┘
                          ↓
┌─────────────────────────────────────────────────────┐ 1008
│   Generate a light field image using the first microlens, the │
│      second microlens, and the first defocus function │
└─────────────────────────────────────────────────────┘
```

1402
Capture a first image using a plurality of microlenses and a plurality of filters, wherein a first filter of the plurality of filters is between a main lens and a first microlens of the plurality of microlenses 1404
Rotate the plurality of filters 1406
Capture a second image using the plurality of microlens and the plurality of filters, wherein a second filter of a plurality of filters is between the main lens and the first microlens of the plurality of microlenses 1408
Generate a light field image using the first image and the second image

FIG. 14

NON-PLANAR LENTICULAR ARRAYS FOR LIGHT FIELD IMAGE CAPTURE

BACKGROUND

The present disclosure relates to light field image capture, and in particular to techniques for increasing the depth of field of light field images.

SUMMARY

Light field cameras can capture information about a light field emanating from a scene. Light field cameras often comprise microlenses. Microlenses are often small lenticular lenses (e.g., diameter less than a millimeter, diameter less than a centimeter, etc.). The information captured using the microlenses of light field camera can be used for imaging to generate a light field image. Compared to conventional imaging methods, light field imaging has advantages such as refocusing and depth estimation after an image has been captured. Light field images are sometimes used to create interactive animations, compute shapes, or add/remove objects in a 3D scene. Many limitations (e.g., camera parameters, low light intensity, limited resolution, etc.) can severely affect the effectiveness of light field imaging and the characteristics of the resulting light field image. For example, a scene with inconsistent lighting may result in a light field image with limited dynamic range. In another example, a camera where all the microlenses are on the same plane may result in a light field image with a limited depth of field (DOF). Depth of field may be the distance between the nearest and farthest objects that are reasonably in focus. For example, a light field image with a higher depth of field would have a sharp resolution from the foreground of the image to background of the image and a light field image with a lower depth of field would have a blurry background of the image and blurred elements in the foreground of the image too. Traditionally, computational techniques (e.g., feature matching, depth computation, super resolution, etc.) have been used to combat these limitations. These computational techniques often require time and computing resources, making real-time capture and display of videos difficult. Most of the computational techniques rely on approximations so they often introduce inaccuracies in the final computed image. In view of these deficiencies, there exists a need to generate high quality light field images without relying on only approximations.

Accordingly, techniques are disclosed herein for changing the positions and/or shapes of microlenses of a light field camera to generate light field images with enhanced DOF and/or dynamic range. For example, a light field camera may have a main lens and a plurality of microlenses. A first microlens of the plurality of microlenses may be on a first plane (e.g., a first distance from the main lens) and a second microlens of the plurality of microlenses may be on a second plane (e.g., a second distance from the main lens). The two microlenses may provide information (e.g., focus information). For example, the two microlenses may be used to capture data relating to a scene. In some embodiments, captured focus information can be used to determine which of the plurality of microlenses is the most focused. Once the most focused microlens is identified, a plurality of defocus functions can be determined for the other microlenses. For example, if the first microlens on the first plane is the most focused, a defocus function can be determined for the second microlens on the second plane based on the distance between the first plane and the second plane. A restoration operation can then be applied to information captured using the second microlens, wherein the restoration operation is dependent on the defocus function determined for the second microlens. A light field image can be generated using the information captured using the first microlens, the information captured using the second microlens, and the restoration operation determined using the defocus function. The varying distances of the first microlens and the second microlens from the main lens allows for increased DOF for the generated light field image and does not require feature matching or depth computation. One or more light field images generated using this methodology may be combined to generate light field video sequences with increased DOF.

The positions of one or more microlenses may change as the one or more microlenses are used to capture information. For example, a first microlens may be coupled to a first extending member. In some embodiments, the extending member may be a micro-electromechanical system (MEMS) component, a micro piezoelectric component, and/or other electro-mechanical controllers. The first microlens may be used to capture a first image at a first distance from the main lens, then the member extends the first microlens to a second distance from the main lens. The first microlens may then be used to capture a second image at the second distance. The member may extend automatically or manually. For example, the first microlens may provide focus information from the first position for a scene. The light field camera may use the focus information from the first position to determine that the second position may result in better focus information and automatically extend the member so that the first microlens is the second distance from the main lens. In another example, a user may manually change the position of the first microlens from the first position to the second position. A light field image may be generated using the first image captured at the first distance from the main lens and/or using the second image captured at the second distance from the main lens. In some embodiments, defocus functions are determined for each position. For example, a first defocus function may be determined when the first microlens is at the first position and a second defocus function may be determined when the first microlens at the second position. The first and second defocus functions may be used to generate one or more restoration operations. The one or more restoration operations can be used to generate a light field image or images with increased DOF.

The shape of one or more microlenses of a light field camera may change as the light field camera captures information. For example, a first microlens of a plurality of microlenses may be a first shape and provide information (e.g., brightness information) about a scene. In some embodiments, brightness information captured using one or more microlenses of the plurality of microlenses is used to determine the brightness exposure of a regions of the scene. For example, the brightness information captured using the first microlens may indicate a brightness level over a brightness threshold in a region of the scene indicating that the region of the scene is overexposed. Once the light field camera determines that the region of the scene has a brightness level outside a brightness threshold, the light field camera may change the shape of the first microlens from a first shape to a second shape. The light field camera may expand or contract the first microlens to change the shape of the first microlens. For example, the light field camera may use one or more members connected to the first microlens to expand or contract the shape of the first microlens. In another example, a pressure of a fluid may be manipulated to expand or contract the shape of the first microlens. A light field image can be generated using the information captured using the first microlens and the plurality of microlenses after the first microlens has changed shape. Due to the first microlens changing from the first shape to the second shape, the resulting light field image may have increased dynamic range and/or increased resolution. One or more light field images generated using this methodology may be combined to generate a light field video sequences with increased dynamic range and/or increased resolution. In some embodiments the shape of one or more microlenses may be changed in addition to the plane of one or more microlenses.

Rotating filters may be used along with one or more microlenses of a plurality of microlenses so that different microlenses can be used to capture details for various ranges of brightness in a scene. For example, a first filter may be between a first microlens and the scene, a second filter may be between a second microlens and the scene, a third filter may be between a third microlens and the scene, and a fourth filter may be between a fourth microlens and the scene. A first light field image may be generated using the information captured using each of the microlenses. The filters may then rotate so that each filter is between a different microlens and the scene. For example, the first filter may be between the second microlens and the scene, the second filter may be between the third microlens and the scene, the third filter may be between the fourth microlens and the scene, and the first filter may be between the first microlens and the scene. A second light field image may be generated using the information captured using each of the microlenses with the new filter orientation. The first light field image and the second light field image may have different dynamic ranges due to the size, shape, and/or placement of the microlenses and the orientation of the filters. The first light field image and the second light filed image can be combined to create a single high dynamic range (HDR) image. Additional light field images may be generated as the filters rotate, further increasing the dynamic range of the HDR image. Different types of filters may be used to capture not only HDR images and videos, but also multi-spectral images and videos.

BRIEF DESCRIPTION OF THE DRAWINGS

The above and other objects and advantages of the disclosure will be apparent upon consideration of the following detailed description, taken in conjunction with the accompanying drawings:

FIGS. 1A-1D show illustrative diagrams of devices with microlenses, in accordance with embodiments of the disclosure;

FIGS. 2A and 2B show illustrative diagrams of a device for changing the shape of a microlens, in accordance with embodiments of the disclosure;

FIGS. 3A and 3B show other illustrative diagrams of a device for changing the shape of a microlens, in accordance with embodiments of the disclosure;

FIGS. 4A-4C show other illustrative diagrams of a device for changing the position and/or shape of a microlens, in accordance with embodiments of the disclosure;

FIG. 10 is an illustrative flowchart of a process for generating a light field image using microlenses on different planes, in accordance with embodiments of the disclosure;

FIG. 14 is an illustrative flowchart of a process for generating a light field image using a device with a rotating filter, in accordance with embodiments of the disclosure.

DETAILED DESCRIPTION

Figure 1B:
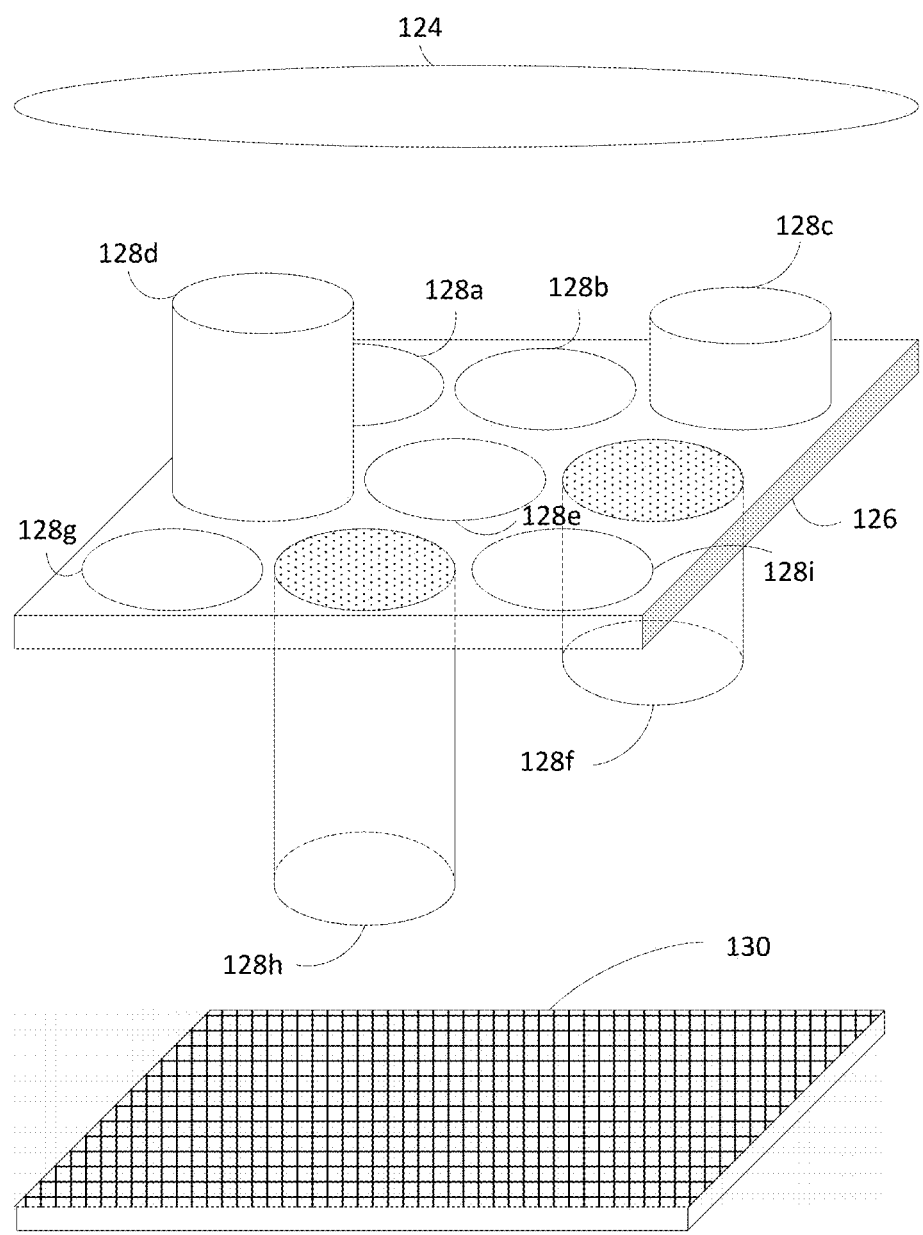

FIG. 1A shows an illustrative diagram of a device 102 comprising a main lens 104, a first microlens 108a, a second microlens 108b, and a photosensor array 110. In some embodiments, the microlenses are coupled to a platform 106. Although only two microlenses are shown, any number of microlenses may be housed within the device 102. In some embodiments, the device 102 may be a camera (e.g., light field camera). In some embodiments, not all components of the device 102 are shown to avoid overcomplicating the drawing.

In some embodiments, the first microlens 108a is on a first plane (e.g., a first distance d1 from the main lens 104) and the second microlens 108b is on a second plane (e.g., a second distance d2 from the main lens 104). The device 102 can use the first microlens 108a and the second microlens 108b to capture information. For example, information (e.g., photons) from a scene may pass through the main lens 104 and the first microlens 108a, then the information is captured by the photosensor 110 array. Information from the scene may also pass through the main lens 104 and the second microlens 108b, then the information is captured by the photosensor 110 array. In some embodiments, the information captured using the first microlens 108a is different from the information captured using the second microlens 108b because the distances between the main lens 104 and the respective microlenses are different. In some embodiments, the information captured using the microlenses are used to determine which of the microlenses are used to capture information that is the most in focus. This determination may change based on the scene, lighting, etc. For example, the first microlens 108a may capture information that is more in focus than information captured using the second microlens 108b in a first scene with a subject located farther away (e.g., 10 meters) from the device 102. In another example, the second microlens 108b may capture information that is more in focus than information captured using the first microlens 108a in a second scene with a subject located closer (e.g., 30 centimeters) to the device 102. In some embodiments, image sharpness may be measured to determine which of the microlenses are used to capture information that is the most in focus. For example, a first portion of an image may be generated or partially generated using the information captured using the first microlens 108a. The device 102 may determine the image sharpness using the rise distance of a tone or color edge of an object portrayed in the portion of the image. The rise distance may correspond to the distance (in pixels, millimeters, or fraction of image height) for the pixel level to go from 10% to 90% of its final value. In another example, a first portion of an image may be generated or partially generated using the information captured using the first microlens 108a. The device 102 may determine the image sharpness using frequency measurements. Frequency measurements may measure in cycles per distance and/or line pairs per distance, where the distance may be millimeters, inches, pixels, and/or image height. For example, line pairs per millimeter (lp/mm), Cycles per pixel (C/P), and/or line width per picture height (LW/PH) may be measured.

In some embodiments, the information captured using the first microlens 108a and the second microlens 108b can be used to determine a defocus function. For example, if the first microlens 108a captures information that is the most focused, a defocus function can be determined for the second microlens 108b based at least in part on the distance between the first microlens 108a and the second microlens 108b. In some embodiments, a restoration operation is determined using the defocus function. For example, the inverse of the defocus function may be the restoration operation. The determined restoration operation can then be applied to the information captured using one or more lenses that are determined to be less in focus. For example, if the defocus function was calculated for the second microlens 108b, then the restoration operation calculated using the defocus function can be applied to the information captured using the second microlens 108b.

In some embodiments, one or more light field images are generated using the information captured using the first microlens 108a, the information captured using the second microlens 108b, and the restoration operation determined using the defocus function. For example, the restoration operation can be applied to the information captured using the second microlens 108b to generate restored information. The device 102 may generate a light field image using the information captured using the first microlens 108a and the restored information generated using the information captured using the second microlens 108b, and the restoration operation. In some embodiments, the varying distances of the first microlens 108a and the second microlens 108b from the main lens 104 allows for increased DOF for the generated light field image, and does not require feature matching, stereo matching, and/or depth computation. Feature matching may refer to using the process of recognizing features of the same object across images with slightly different viewpoints to increase a DOF of a generated image. Stereo matching may refer to using the process of comparing the surroundings of a pixel in a first image to a slightly translated positions of the pixel in a second image to estimate the disparity of the pixel to increase a DOF of a generated image. Depth computations may refer to any technique used to calculate the depth of one or more objects in an image. In some embodiments, one or more light field images generated using any of the techniques described herein are combined to generate light field video sequences with increased DOF.

In some embodiments, the positions of the microlenses change. For example, the first microlens 108a and the second microlens 108b may start on the same plane (e.g., having the same distance from the main lens 104) and then the second microlens 108b may be moved to a different plane. In some embodiments, the second microlens 108b is coupled to a member 112 that can adjust the position of the second microlens 108b. The second microlens 108b may be used to capture information in a first position (e.g., on the same plane as the first microlens 108a) then the member 122 extends the second microlens 108b to a second position (e.g., different plane as the first microlens 108a). In some embodiments, the second microlens 108b captures additional information at the second position.

In some embodiments, the member 112 changes the position of the second microlens 108b based on information captured using the second microlens 108b. For example, the second microlens 108b may be used to capture information from a first position. In some embodiments, the device 102 calculates a second position for the second microlens 108b using the information captured using the second microlens 108b in the first position. For example, the device 102 may determine that moving the second microlens 108b to a second position may result in an increased DOF for an image generated using the information captured using the microlenses (e.g., first microlens 108a and second microlens 108b). In some embodiments, the member 112 extends to move the second microlens 108b from the first position to the second position. In some embodiments, the member 112 retracts to move the second microlens 108b from a first position to the second position. The positions of one or more microlenses may change based on an input from a user. For example, the device 102 may comprise one or more interfaces (e.g., buttons, touch screen, switches, etc.) allowing a user to input commands. In some embodiments, the member 112 changes the second microlens 108b from a first position to a second position based on an input received by a user.

Light field images may be generated with microlenses at different positions. For example, a light field image may be generated using the information captured using the first microlens 108a, the information captured using the second microlens 108b at a first position, and the information captured using the second microlens 108b at a second position. In some embodiments, defocus functions are determined for each position of a microlens. For example, a first defocus function may be determined when the second microlens 108b is at a first position and a second defocus function may be determined when the second microlens 108b is at a second position. In some embodiments, the first and second defocus functions may be used to generate one or more restoration operations. The information captured using the first microlens 108a, the information captured using the second microlens 108b at the first position, the information captured using the second microlens 108b at the second position, and/or restoration operations determined using the defocus functions can be used to generate a light field image or images with increased DOF.

FIG. 1B shows an illustrative diagram of a device 122 comprising a main lens 124, a plurality of microlenses 128a-128i, and a photosensor array 130. In some embodiments, the plurality of microlenses are coupled to a platform 126. In some embodiments, the device 122 may be a camera (e.g., light field camera). In some embodiments, not all components of the device 122 are shown to avoid overcomplicating the drawing.

FIG. 1B may use any of the methodologies described in FIG. 1A. For example, information captured using one or more of the plurality of microlenses 128a-128i can be used to determine a defocus function. If the third microlens 128c captures information that is the most focused, a defocus function may be determined for one or more of the other microlenses (e.g., 128a, 128d, 128h, etc.) of the plurality of microlenses based on the difference(s) in position(s) of the third microlens 128c and the one or more of the other microlenses. In some embodiments, one or more restoration operations are determined using one or more defocus functions. For example, the inverse of a first defocus function determined for the first microlens 128a may be a first restoration operation and the inverse of a third defocus function determined for the fourth microlens 128d may be a third restoration operation. In some embodiments, the one or more restoration operations are applied to the information captured from the respective microlenses. For example, the first defocus function may be applied to the information captured using the first microlens 128a, and the third defocus function may be applied to the information captured using the fourth microlens 128d.

In some embodiments, one or more light field images are generated using the information captured using one or more of the plurality of microlenses 128a-128i and the one or more restoration operations determined using the defocus functions. For example, a first restoration operation can be applied to the information captured using the first microlens 128b to generate first restored information. A second restoration operation can be applied to the information captured using the second microlens 128b to generate second restored information. A third restoration operation can be applied to the information captured using the fourth microlens 128d to generate fourth restored information. The device 122 may generate a light field image using the information captured using the third microlens 128c, first restored information, second restored information, and third restored information. Although four microlenses are described in this example, any number of microlenses may be used.

In some embodiments, the device 122 is programmed so that one or more of the plurality of microlenses 128a-128i are on a different plane than another of the one or more plurality of microlenses 128a-128i. For example, the configuration of the plurality of microlenses 128a-128i shown in FIG. 1B may be the default configuration associated with the device 122. In some embodiments, the positions of one or more of the plurality of microlenses 128a-128i change. For example, the plurality of microlenses 128a-128i may all start on the same plane (e.g., have the same distance from the main lens 124) and the third microlens 128c, fourth microlens 128d, sixth microlens 128f, and eighth microlens 128h may change to different planes.

In some embodiments, the positions of the plurality of microlenses 128a-128i change based on information captured using the plurality of microlenses 128a-128i. For example, based on information captured using the third microlens 128c, the device 122 may determine that moving the third microlens 128c to a second position may result in an increased DOF for an image generated using the information captured using the plurality of microlenses 128a-128i. In some embodiments, the positions of one or more microlenses of the plurality of microlenses 128a-128i change based on an input from a user. For example, the device 122 may comprise one or more interfaces allowing a user to input commands. In some embodiments, the device 122 changes the position of one of the plurality of microlenses 128a-128i based on an input of a user. For example, the device 122 may change the third microlens 128c from a first position to a second position based on a received input.

In some embodiments, the device 122 changes the positions of more than one of the plurality of microlenses 128a-128i based on a single input of a user. For example, the device 122 may change the position of the third microlens 128c, the fourth microlens 128d, the sixth microlens 128f, and the eighth microlens, based on a received input.

Figure 1C:
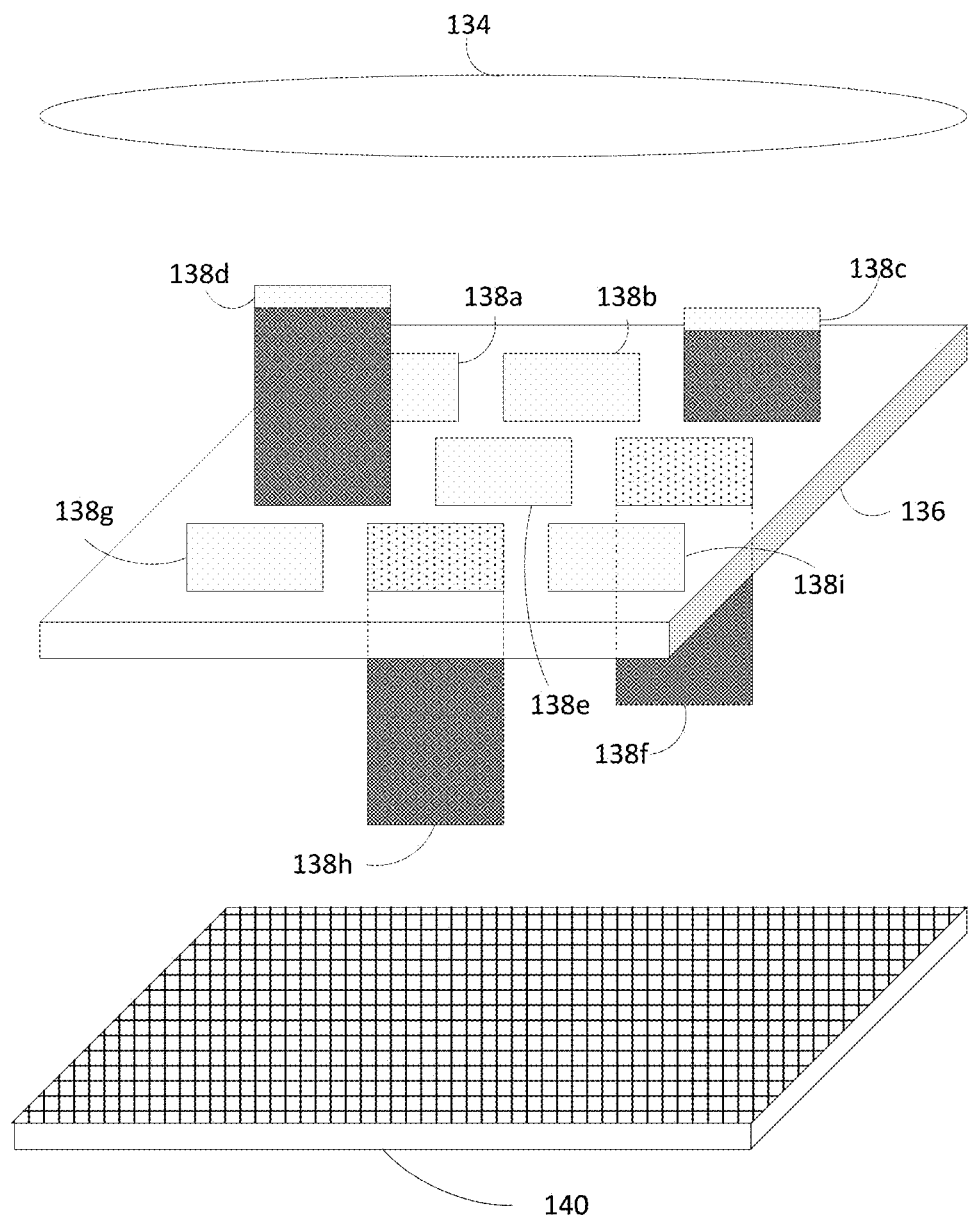

FIG. 1C shows an illustrative diagram of a device 132 comprising a main lens 134, a plurality of microlenses 138a-138i, and a photosensor array 140. In some embodiments, the plurality of microlenses are coupled to a platform 136. In some embodiments, the device 132 may be a camera (e.g., light field camera). In some embodiments, not all components of the device 132 are shown to avoid overcomplicating the drawing. FIG. 1C may use any of the methodologies described in FIG. 1A and FIG. 1B. In some embodiments, the plurality of microlenses 138a-138i have rectangular cross-sections as displayed in FIG. 1C. In some embodiments, the plurality of microlenses 138a-138i may have circular cross-sections as displayed in FIG. 1B. Although circle cross-sections and rectangular cross-sections are shown, other shapes of lenses and/or cross-sections may be used for one or more of the plurality of the microlenses 138a-138i. For example, one or more of the plurality of microlenses 138a-138i may be triangles, hexagons, and/or similar such shapes. In some embodiments, the shape of a microlens is used when determining a defocus function for a microlens. For example, a first defocus function may be determined for the first microlens 138a of FIG. 1C based on the cross-sectional shape being a square, and a second defocus function may be determined for the first microlens 128a of FIG. 1B based on the cross-sectional shape being a circle.

Figure 1D:
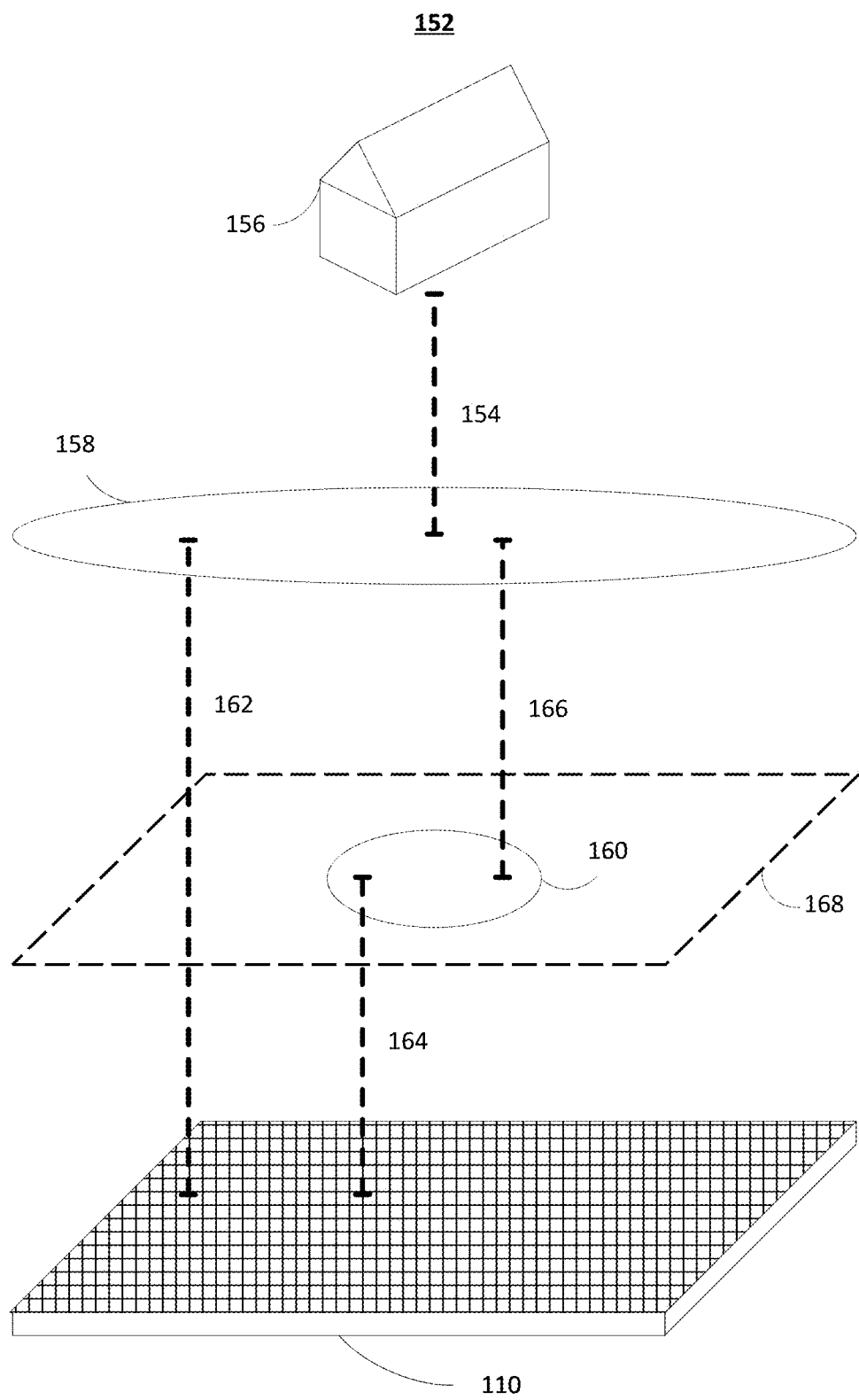

FIG. 1D shows an illustrative diagram 152 of a device with microlenses, in accordance with embodiments of the disclosure. In some embodiments, the following equations may be used in generating an image (light field image) using any of the devices described herein.

$$\text{Depth of Field } (DOF) = (2d^2 cN)/f^2 \tag{1}$$

f: focal length of a lens.
d: distance 154 to a subject 156.
N: f-stop number for aperture setting.
c: Circle of Confusion, represents "acceptably" sharp focus, i.e., how large a circle can be accepted instead of a point in an image for the focus to still be consider acceptable.

In some embodiments, if $d_o$ is the distance of the lens to an object in 3D, and $d_i$ is the distance of the image from the lens, in some embodiments the following equation is satisfied:

$$1/f = 1/d_o + 1/d_i$$

If an object is very far away, or $d_o = \infty$, then $d_i = f$. Otherwise the distance of the image plane from the lens is greater than the focal length of the lens.

Effective Focal Length of Combination of Primary and Micro Lens with Separation (S)

In some embodiments, for the effective focal length of a combination of lenses, specifically a primary lens (e.g., main lens) 158 and microlens 160, we can assume the following:
$f_1$: focal length 162 of primary lens 158.
$f_2$: focal length 164 of microlens 160.
S: distance 166 between the primary lens 158 and microlens 160.

In some embodiments, the effective focal length of the two lenses, as shown is given by:

$$1/f = 1/f_1 + 1/f_2 - S/f_1 f_2 = (f_1 + f_2 - S)/f_1 f_2 \quad (2)$$

$$\text{Or, } f = f_1 f_2 / (f_1 + f_2 - S)$$

In some embodiments, combining (1) and (2), results in:

$$DOF = (2d^2 cN)(f_1 + f_2 - S)^2 / (f_1 f_2)^2 \quad (3)$$

Increasing Effective DOF Through Non-Planar Micro-Lens Placement

In some embodiments, microlenses are placed in a non-planar manner and the distance between the primary lens 158 and a microlens (e.g., microlens 160) varies. Accordingly, Equation (3) may be modified to:

$$DOF = (2d^2 cN)(f_1 + f_2 - S \pm kdx)^2 / (f_1 f_2)^2 \quad (4)$$

In some embodiments, dx is length of 1 step of movement of a microlens a microlens (e.g., microlens 160) from the primary plane 168, and k is the number of steps a microlens is moved from the primary plane 168. In some embodiments, a microlens (e.g., microlens 160) can be moved in both positive and negative directions perpendicular to the primary plane 168, thus the "±" sign before the "k dx" term.

Figure 2A:
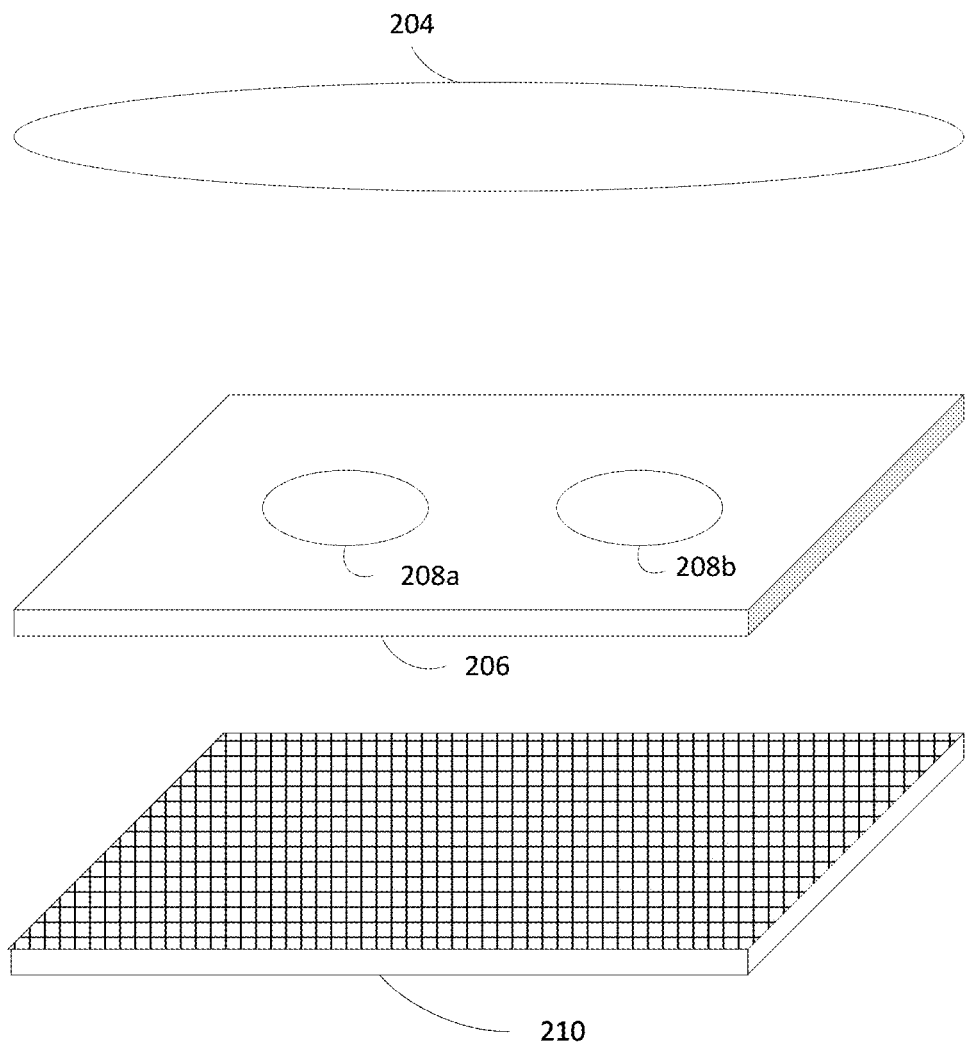

FIGS. 2A and 2B show illustrative diagrams of a device 202 comprising a main lens 204, a first microlenses 208a, a second microlens 208b, and a photosensor array 210. In some embodiments, the microlenses are coupled to a platform 206. Although two microlenses are shown, any number of microlenses may be housed within the device 202. In some embodiments, the device 202 may be a camera (e.g., light field camera). In some embodiments, not all components of the device 202 are shown to avoid overcomplicating the drawing.

FIG. 2A shows the device 202 using the first microlens 208a and the second microlens 208b to capture information about a scene, wherein the first microlens 208a and the second microlens 208b are both a first shape. In some embodiments, the information captured using the first microlens 208a and the second microlens 208b is used to determine the brightness exposure of a region of the scene. For example, the device 202 may use the captured information to determine that a brightness level of a first region of a scene is under a brightness threshold. In some embodiments, the brightness level corresponds to the calculated luminance and/or luma of a portion of a region of the scene. In some embodiments, the device 202 uses one or more sensors to calculate the brightness level of a region of a scene.

FIG. 2B shows the device 202 using the first microlens 208a and the second microlens 208b to capture information about a scene, wherein the first microlens 208a is a first shape and the second microlens 208b is a second shape. In some embodiments, the shape of one or more microlenses (e.g., second microlens 208b) of the device 202 changes based on the determined brightness level (e.g., the device 202 may increase a size of a microlens to increase a brightness level, and may decrease a size of a microlens to decrease a brightness level). For example, the device 202 may change the second microlens 208b from the first shape (FIG. 2A) to the second shape (FIG. 2B) based on the device 202 determining that a brightness level of a first region of a scene is under a brightness threshold. In some embodiments, the device 202 changes the shape of the second microlens 208b based on an input from a user. For example, the device 202 may comprise one or more interfaces allowing a user to input commands. For example, the device 202 may change the second microlens 208b from the first shape to the second shape based on a received input. In some embodiments, the device 202 changes the shapes of more than one of the microlenses based on a single input of a user. For example, the device 202 may change the shape of the first microlens 208a and the second microlens 208b based on a received input.

In some embodiments, the device 202 expands or contracts the second microlens 208b to change the shape of the second microlens 208b. For example, the second microlens 208b may be connected to one or more members that expand or contract the shape of the second microlens 208b. In another example, a pressure of a fluid may be manipulated to expand or contract the shape of the second microlens 208b. In some embodiments, one or more filters are used to manipulate the shape of second microlens 208b. For example, a filter may cover a portion of the second microlens 208b so that the shape of the second microlens 208b that is used for capturing information changes from a first shape to a second shape.

In some embodiments, the device 202 generates one or more light field images using the information captured using the first microlens 208a and the second microlens 208b after the second microlens 208b has changed shape. In some embodiments, the device 202 uses the information captured using the first microlens 208a and the second microlens 208b before that second microlens 208b changes shape, in addition to the information captured using the first microlens 208a and the second microlens 208b after the second microlens 208b has changed shape. In some embodiments, due to the second microlens 208b changing from the first shape to the second shape, the resulting light field image may have increased dynamic range and/or increased resolution. In some embodiments, one or more light field images generated using any of the methodologies described herein may be combined to generate a light field video sequences with increased dynamic range and/or increased resolution.

FIGS. 3A and 3B show illustrative diagrams of a device 302 comprising a main lens 304, a first microlenses 308a, a second microlens 308b, and a photosensor array 310. In some embodiments, the microlenses are coupled to a platform 306. Although two microlenses are shown, any number of microlenses may be housed within the device 302. In some embodiments, the device 302 may be a camera (e.g., light field camera). In some embodiments, not all components of the device 302 are shown to avoid overcomplicating the drawing. FIGS. 3A and 3B may use any of the methodologies described in FIG. 2A and FIG. 2B. In some embodiments, the first microlens 308a and second microlens 308b may have rectangular cross-sections as displayed in FIGS. 3A and 3B. In some embodiments, the first microlens 308a and second microlens 308b may have circular cross-sections as displayed in FIGS. 2A and 2B. Although circle cross-sections and rectangular cross-sections are shown, other shapes of lenses and/or cross-sections may be used for one or more of the microlenses. For example, one or more of the microlenses may be triangles, hexagons, and/or similar such shapes. In some embodiments, the shape of one or more microlenses (e.g., second microlens 308*b*) of the device 302 changes based on the determined brightness level. For example, the device 302 may change the second microlens 308*b* from the first shape (FIG. 3A) to the second shape (FIG. 3B) based on the device 302 determining that a brightness level of a first region of a scene is under a brightness threshold. In some embodiments, the device 302 changes the shape of the second microlens 308*b* based on an input from a user.

Figure 4C:
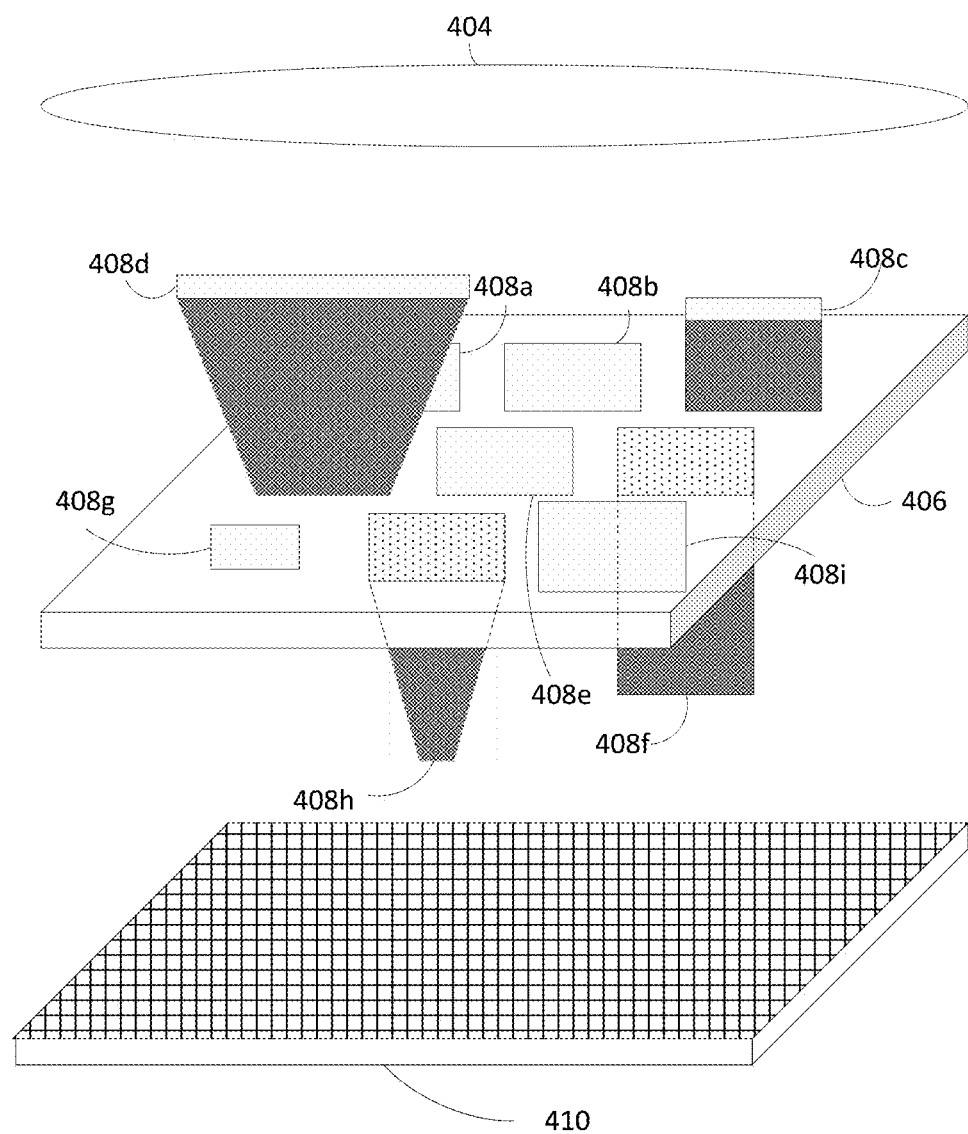

FIGS. 4A-4C show illustrative diagrams of a device 402 comprising a main lens 404, a plurality of microlenses 408*a*-408*i*, and a photosensor array 410. In some embodiments, the plurality of microlenses 408*a*-408 are coupled to a platform 406. Although nine microlenses are shown, any number of microlenses may be housed within the device 402. In some embodiments, the device 402 may be a camera (e.g., light field camera). In some embodiments, not all components of the device 402 are shown to avoid overcomplicating the drawing. FIGS. 4A-4C may use any of the methodologies described in FIGS. 1A-3B.

FIG. 4A shows the device 402 using the plurality of microlenses 408*a*-408*i* to capture information about a scene, wherein the plurality of microlenses 408*a*-408*i* are all a first shape. In some embodiments, the information captured using the plurality of microlenses 408*a*-408*i* is used to determine the brightness exposure of one or more regions of the scene. For example, the device 402 may use the captured information to determine that a brightness level of a first region of a scene is under a brightness threshold and a brightness level of a second region of the scene is above a brightness threshold.

FIG. 4B shows the device 402 using the plurality of microlenses 408*a*-408*i* to capture information about a scene. In some embodiments, the shapes of the first microlens 408*a*, third microlens 408*c*, fifth microlens 408*e*, seventh microlens 408*g*, and eighth microlens 408*h* have changed based on the determined brightness level. For example, the device 402 may change the first microlens 408*a* from the first shape (FIG. 4A) to a second shape (FIG. 4B) based on the device 202 determining that a brightness level of a first region of a scene is over a brightness threshold. The device 402 may also change the fifth microlens 408*e* from the first shape (FIG. 4A) to a third shape (FIG. 4B) based on the device 402 determining that a brightness level of a second region of a scene is below a brightness threshold. In some embodiments, the device 402 changes the shape of one or more of the plurality of microlenses 408*a*-408*i* based on an input from a user. For example, the device 402 may comprise one or more interfaces allowing a user to input commands. For example, the device 402 may change the third microlens 408*c* from the first shape to a fourth shape based on a received input. In some embodiments, the device 402 changes the shapes of more than one of the microlenses based on a single input of a user. For example, the device 402 may change the shape of the seventh microlens 408*g* and the eighth microlens 408*h* based on a received input.

In some embodiments, the device 402 expands or contracts one or more of the plurality of microlenses 408*a*-408*i* to change the shape of the one or more microlenses 408*a*-408*i*. For example, the first microlens 408*a* may be connected to one or more members that expand or contract the shape of the first microlens 408*a*. In some embodiments, a pressure of a fluid may be manipulated to expand or contract the shape of one or more microlenses. For example, fluid may be used to contract the shape of the seventh microlens 408*g* and expand the shape of the eighth microlens 408*h*. In some embodiments, one or more filters are used to manipulate the shape of one or more microlenses. For example, a filter may cover a portion of the third microlens 408*c* so that the shape of the third microlens 408*c* that is used for capturing information changes shapes.

In some embodiments, the device 402 generates one or more light field images using the information captured using the plurality of microlenses 408*a*-408*i* after one or more of the plurality of microlenses 408*a*-408*i* have changed shape. In some embodiments, the device 402 uses the information captured using the plurality of microlenses 408*a*-408*i* before one or more of the plurality of microlenses 408*a*-408*i* changes shape in addition to information captured using the plurality of microlenses 408*a*-408*i* after one or more of the plurality of microlenses 408*a*-408*i* change shape. In some embodiments, one or more light field images generated using any of the methodologies described here may be combined to generate a light field video sequence with increased dynamic range and/or increased resolution.

FIG. 4C shows the device 402 using the plurality of microlenses 408*a*-408*i* to capture information about a scene. In some embodiments, the captured information can be used to determine brightness levels and/or defocus functions. In some embodiments, the device 402 changes the shapes of the fourth microlens 408*a*, seventh microlens 408*g*, eighth microlens 408*h*, and ninth microlens 408*e* based on determined brightness levels. In some embodiments, the device 402 changes the positions and/or shape of the third microlens 408*c*, fourth microlens 408*d*, sixth microlens 408*f*, and eighth microlens 408*h* to increase a DOF of an image generated using the information captured using the plurality of microlenses 408*a*-408*i*. In some embodiments, the device 402 uses the brightness levels and/or the focus information to determine a change in the position and/or shape of a microlens. For example, based on the brightness level for a region of a scene and the focus information captured using the fourth microlens 408*d* the device 402 may determine that the fourth microlens 408*a* should change from a first shape (FIG. 4A) and a first position (FIG. 4A) to a second shape (FIG. 4C) and a second position (FIG. 4C). In some embodiments, the device 402 increases a size of a microlens to increase a brightness level associated with a region of a scene and the device 402 decreases a size of a microlens to decrease a brightness level associated with a region of a scene. In some embodiments, the device 402 may move a microlens closer to the main lens to increase the focus on an object in the foreground of an image and move a microlens further from the main lens to increase the focus on an object in the background of an image. In some embodiments, the device 402 changes the shape and/or position of one or more of the plurality of microlenses 408*a*-408*i* based on an input from a user. In some embodiments, the device 402 changes the shape and/or position of more than one of the plurality of microlenses 408*a*-408*i* based on a single input of a user.

In some embodiments, information captured using one or more of the plurality of microlenses 408*a*-408*i* is used to determine one or more defocus functions. In some embodiments, one or more restoration operations are determined using one or more defocus functions. For example, the inverse of a defocus function determined for the first microlens 408*a* may be a first restoration operation and the inverse of a third defocus function determined for the fourth microlens 408*d* may be a third restoration operation. In some embodiments, the one or more restoration operations are applied to the information captured from the respective microlenses. For example, the first defocus function may be applied to the information captured using the first microlens 408*a*, and the third defocus function may be applied to the information captured using the fourth microlens 408d. In some embodiments, the defocus functions and/or restoration functions are determined using the shape of the microlens and/or the distance between the microlens and the most focused microlens.

In some embodiments, one or more light field images are generated using the information captured using one or more of the plurality of microlenses 408a-408i and the one or more restoration operation determined using defocus functions. For example, a first restoration operation can be applied to the information captured using the first microlens 408a to generate first restored information. A second restoration operation can be applied to the information captured using the second microlens 408b to generate second restored information. A third restoration operation can be applied to the information captured using the fourth microlens 128d to generate third restored information. The device 402 may generate a light field image using the information captured using the third microlens 408c, first restored information, second restored information, and third restored information. Although only four microlenses are described in this example, any number of microlenses may be used.

Figure 5A:
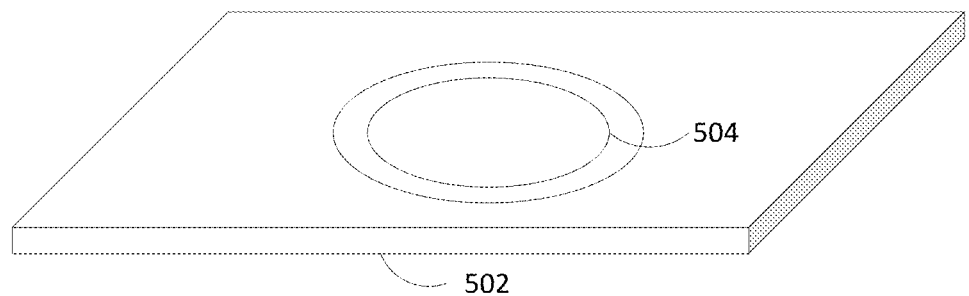
FIGS. 5A-5C show illustrative diagrams of a mechanism for changing the position and/or shape of a microlens, in accordance with embodiments of the disclosure.
Figure 5B:
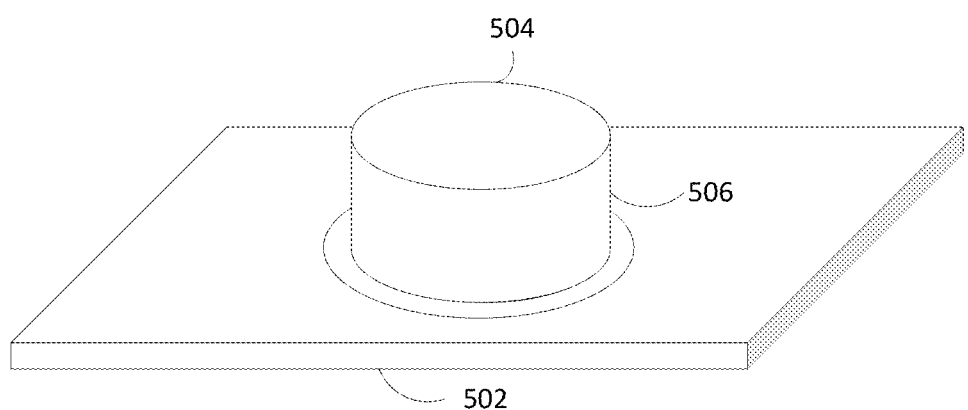
Figure 5C:
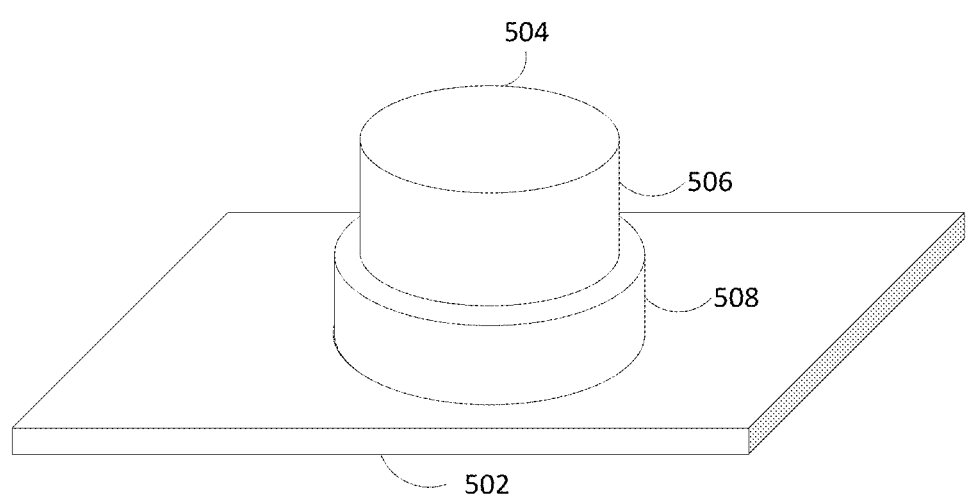

FIGS. 5A-5C show illustrative diagrams of a mechanism for changing the position and/or shape of a microlens 504, in accordance with embodiments of the disclosure. In some embodiments, the microlenses 504 is coupled to a platform 502. Although only one microlens is shown, any number of microlenses may be coupled to the platform 502 and/or use a mechanism similar to what is displayed in FIGS. 5A-5C.

FIG. 5A displays the microlens 504 in a first position. FIG. 5B displays the microlens 504 in a second position. In some embodiments, the microlens 504 is coupled to a first member 506. In some embodiments, the first member 506 extends the microlens 504 away from the platform 502. For example, the member 506 may extend in the direction shown in FIGS. 5A-5C and/or in the opposite direction (e.g., extend below the platform 502).

FIG. 5C displays the microlens 504 in a third position. In some embodiments, the microlens 504 is coupled to the first member 506 and the second member 508. In some embodiments, the second member 508 extends the microlens 504 away from the platform 502. In some embodiments, the first member 506 and/or second member 508 change the position of the microlens 504 based on information captured using the microlens 504. For example, the microlens 504 may be used to capture information from the first position and a device calculates a second position for the microlens 504 using the information captured using the microlens 504 in the first position. In some embodiments, a device determines that moving the microlens 504 to the third position may result in an increased DOF for an image generated using the information captured using a plurality of microlenses. In some embodiments, the first member 506 and/or second member 508 change the position of the microlens 504 based on an input from the user.

FIGS. 6A-6D show illustrative diagrams of devices and parameters used to generate a light field image, in accordance with embodiments of the disclosure. In some embodiments, a microlenses 604 is coupled to a platform 602. Although one microlens is shown, any number of microlenses may be coupled to the platform 602 and/or use the mechanism displayed in FIGS. 6A-6C.

Figure 6A:
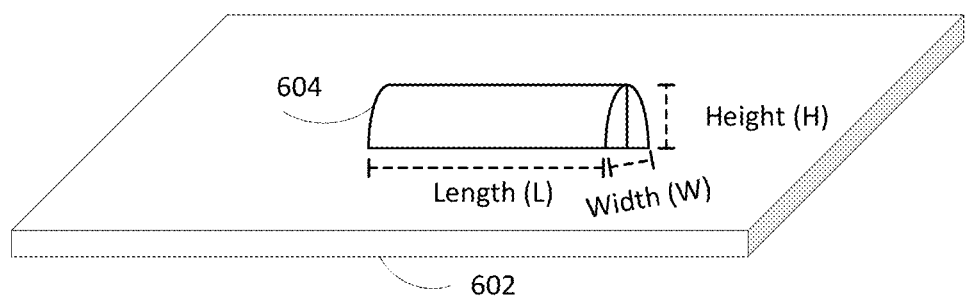
FIGS. 6A-6D show illustrative diagrams of devices and parameters used to generate a light field image, in accordance with embodiments of the disclosure.
Figure 6B:
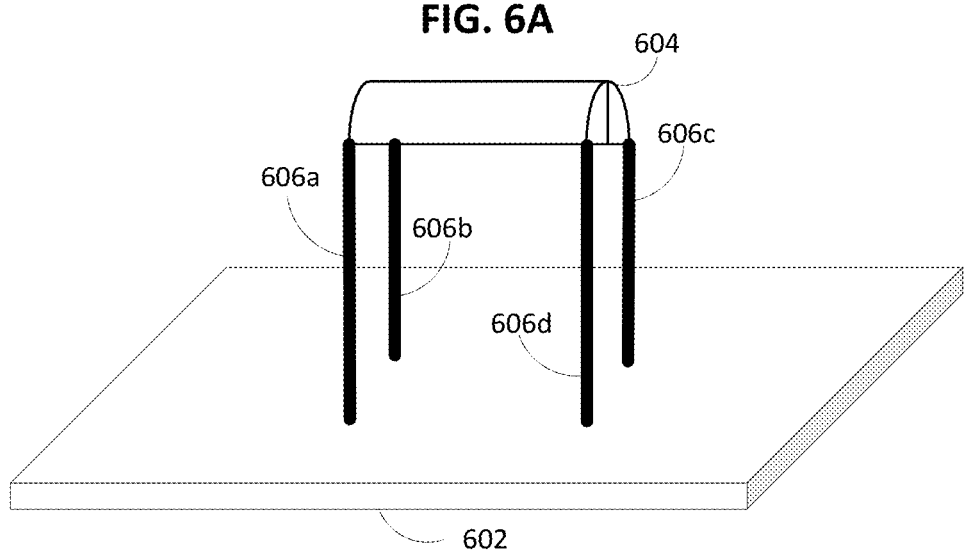

FIG. 6A displays the microlens 604 in a first position and a first shape. FIG. 6B displays the microlens 604 in a second position. In some embodiments, the microlens 604 is coupled to a plurality of members 606a-606d. In some embodiments, the plurality of members 606a-606d are a micro-electromechanical system (MEMS) component, a micro piezoelectric component, and/or other electro-mechanical controllers. In some embodiments, the plurality of members 606a-606d extend the microlens 604 away from the platform 602. For example, the plurality of members 606a-606d may extend in the direction shown in FIGS. 6A-6C and/or in the opposite direction (e.g., extend below the platform 602). In some embodiments, the plurality of members 606a-606d can retract causing the microlens 604 to move toward the platform 602. In some embodiments, one or more of the plurality of members 606a-606d extend, contract, and/or tilt independent of the other members. In some embodiments, the plurality of members 606a-606d change the position of the microlens 604 based on information captured using the microlens 604. In some embodiments, a device determines that moving the microlens 604 to the second position may result in an increased DOF for an image generated using the information captured using a plurality of microlenses. In some embodiments, the plurality of members 606a-606d change the position of the microlens 604 based on an input from the user.

Figure 6C:
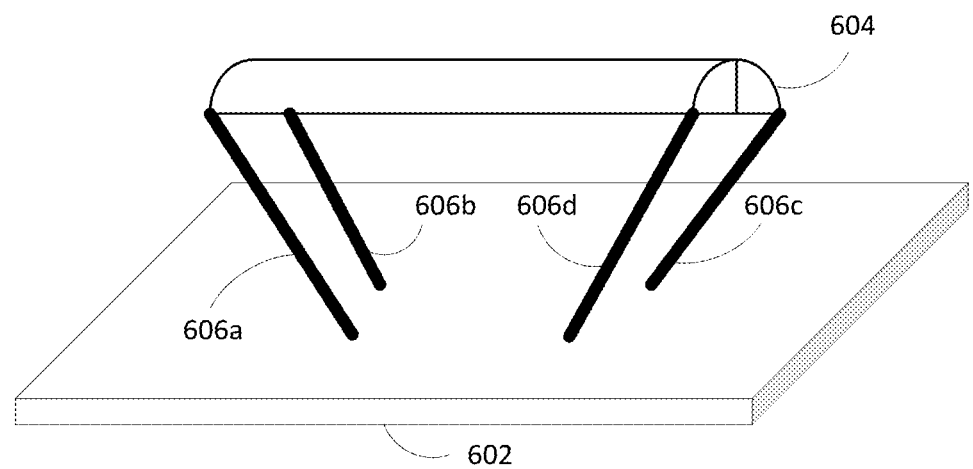

FIG. 6C displays the microlens 504 in the second position in a second shape. In some embodiments, the plurality of members 606a-606d expand the microlens 504 into the second shape as shown in FIG. 6C. In some embodiments, the plurality of members 606a-606d contract the microlens 504. In some embodiments, one or more of the plurality of members 606a-606d have a first side coupled to the platform 602 and a second side coupled to the microlens 604. In some embodiments, one or more of the plurality of members 606a-606d are coupled to the platform so the respective member can tilt. For example, a first side of the first member 606a may be coupled to the platform 602 so that the first member 606a can tilt (e.g., as shown in FIG. 6C). In some embodiments, one or more of the plurality of members 606a-606d are coupled to the platform so the respective member can slide and/or move on the platform. For example, the first side of the first member 606a may be coupled to a track on the platform 602 so the first side of the first member 606a can move along the track.

In some embodiments, the shape of the microlens 604 changes based on a determined brightness level. For example, the plurality of members 606a-606d may change the microlens 604 from the first shape (FIG. 6A) to the second shape (FIG. 6C) based on a device determining a brightness level. In some embodiments, the plurality of members 606a-606d change the shape of the microlens 604 based on an input from a user.

Figure 6D:
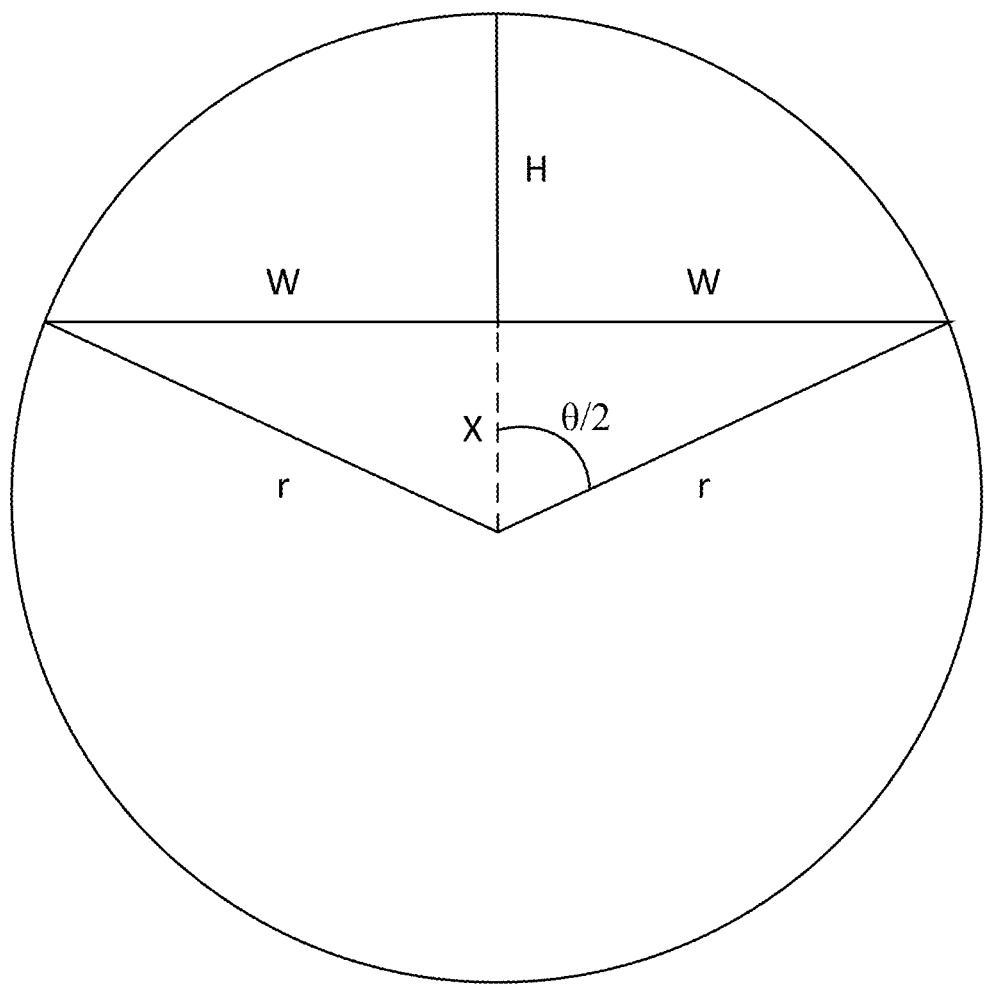

FIG. 6D shows an illustrative diagram 650 of parameters that can be used to calculate the area of a sector of a circle and the volume of a microlens. In some embodiments, the following equations may be used in generating an image (light field image) using the microlens 604 in FIGS. 6A-6C. In some embodiments, the following equations may be used in generating an image using any of the devices described herein:

From Pythagoras Theorem:

$$X^2 + W^2 = r^2, \text{ thus } X^2 = r^2 - W^2 \quad (5)$$

Also, X+H=r $$\rightarrow X = r - H, \text{ or } X^2 = (r - H)^2 \quad (6)$$

Equating the right-hand side of (5) and (6) and simplifying:

$$r = (X^2 + W^2)/2H \quad (7)$$

In some embodiments, $\sin(\theta/2) = W/r$, thus $\theta = 2\sin^{-1}(W/r)$.

The area of the sector of a circle in some embodiments is given by:

$$A = 0.5r^2(\theta - \sin\theta) \quad (8)$$

The volume of the microlens in some embodiments is V=A*L, where * denotes multiplication. In some embodiments, glass microlenses may not be expanded or shrunk easily, but plastic microlenses may be. In some embodiments, the following derivations are based on the premise that when a plastic microlens is expanded (stretched) or shrunk (contracted) its volume remains the same. In some embodiments, when a microlens is stretched or contracted, the parameters W, L and H change, to W', L' and H'. Following this change in the parameters defining the size and shape of microlenses, there are two parameters that may need to be calculated. In some embodiments, the first parameter is the radius r' defining a modified plano-convex lens and the second parameter is the new surface area (2 W'*L') of the front surface of the microlens. The new surface area (2 W'*L'), which we will henceforth denote by 2 W'L', can be determined directly based on the extent of shrinkage or enlargement of a microlens; it determines the amount of light captured using a microlens and hence can be used to control the exposure at a pixel on a sensor plane. In some embodiments, the sensor plane is the plane where the sensors are located.

In some embodiments, computing r' is performed—r' may the focal length of a microlens, and hence the focal length of the composite pair of the primary and microlens combination. In an example, to compute r', the volume of microlens is considered to be constant before and after modifications of its shape. This results in the following relationship:

$$V = A'L' \text{ or, } A' = V/L' \quad (9)$$

In some embodiments, since V is fixed, and L' is known, A' can be determined from Equation (9). However, to determine r', which in turn helps to determine the new focal length of the microlens after it is expanded or contracted, the following steps may be used. Similar to Equation (9), after expansion or contraction of a microlens:

$$A' = 0.5r'^2(\theta' - \sin\theta') \quad (10)$$

$$\sin(\theta'/2) = W'/r', \text{ thus } r' = W'/\sin(\theta'/2) \quad (11)$$

From Equations (10) and (11) we have:

$$A' = \quad (12)$$
$$0.5(W'/\sin(\theta'/2))^2(\theta' - \sin\theta') \rightarrow 2A'(\sin(\theta'/2))^2 + (W')^2(\theta' - \sin\theta') = 0$$

Thus, r' can be computed by solving Equation (12) numerically to obtain θ'. Then, the value of θ' can be used in Equation (11) to obtain r'. The radii of a thick convex lens can be used to compute the focal length (f) of the lens using the formula below:

$$1/f = (1/r_1 - 1/r_2)(n_1 - n_f)/n_f + d(n_1 - n_f)2/(n_1 n_f r_1 r_2).$$

Here,
$r_1$: radius of one surface of a convex lens.
$r_2$: radius of the other surface of the convex lens (this is usually negative for a convex lens).
d: thickness of the lens.
$n_1$: refractive index of the material inside the lens, this varies between 1.3 to 1.6 for plastic.
$n_f$: refractive index of the fluid outside the lens, for air this is equal to 1.

For a plano-convex lens $r_2 = -\infty$, so the formula for focal length simplifies to:

$$1/f = (1/r_1)(n_1 - n_f)/n_f \rightarrow f = r_1/(n_1 - 1) \quad (13)$$

From Equation (13) it follows that if the refractive index (n1) of the plastic material used for a microlens is 1.5, then the focal length (f) is $2r_1$.

Effective Focal Length of Combination of Primary and Micro Lens with Separation (S)

Next, in some embodiments, we consider the effective focal length of a combination of lenses, specifically a primary lens (mainlens) and microlens. The following parameters include:
$f_1$: focal length of primary lens;
$f_2$: focal length of microlens; and
S: distance between the primary lens and microlens.

Then, in some embodiments, the effective focal length of the two lenses, is given by:

$$1/f = 1/f_1 + 1/f_2 - S/f_1 f_2 = (f_1 + f_2 - S)/f_1 f_2. \quad (14)$$

Or, $$f = f_1 f_2/(f_1 + f_2 - S)$$

Combining Equations (9) and (10) provides:

$$f = (f_1 r_1/(n_1 - 1))/(f_1 + r_1/(n_1 - 1) - S) \quad (15)$$

In some embodiments, other types of lenses may result in variations of equations (13), (14) and (15).

FIGS. 7A-7D show illustrative diagrams of mechanisms for changing the position and/or shape of a microlens 702, in accordance with embodiments of the disclosure. In some embodiments, the microlenses 702 is a liquid lens and has a top surface 704. In some embodiments, the top surface 704 is liquid or a film. The microlens 702 can be coupled to a first structure 706 and a second structure 708. Although only one microlens 702 is shown, any number of microlenses may be used.

Figure 7A:
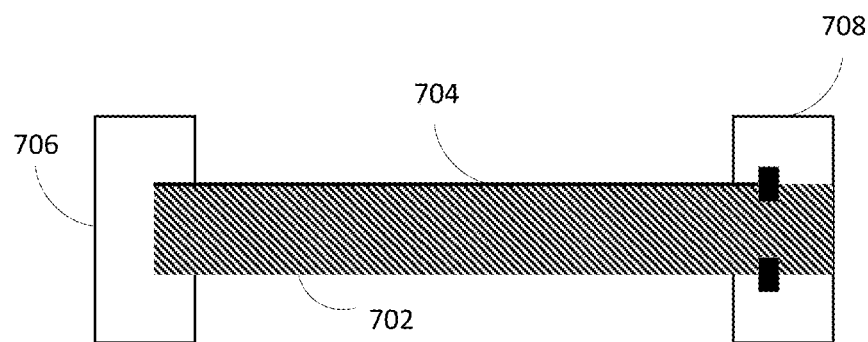
FIGS. 7A-7D show other illustrative diagrams of a mechanism for changing the position and/or shape of a microlens, in accordance with embodiments of the disclosure.
Figure 7B:
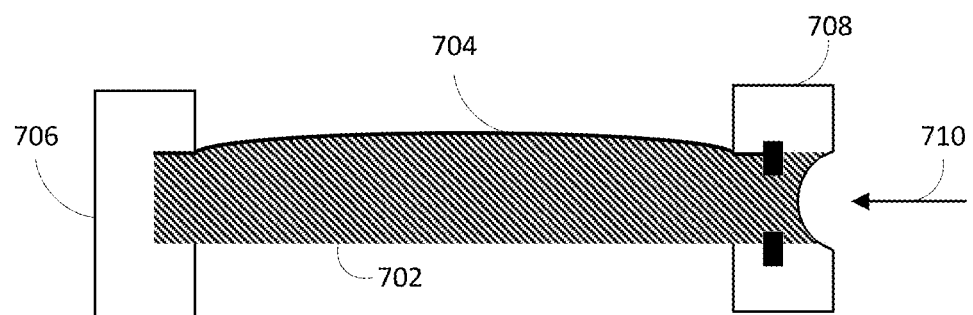

FIG. 7A displays the microlens 702 in a first shape. FIG. 7B displays the microlens 704 in a second shape. In some embodiments, a device changes the microlens 702 from the first shape to the second shape by applying a force 710 to the microlens 702. For example, a device may constrict the microlens 702 so that the top surface 704 becomes more convex. In some embodiments, a device changes the shape of the microlens 702 using electrowetting, shape-changing polymers, acusto-optical tuning, and/or similar such methodologies.

In some embodiments, the shape of the microlens 702 changes based on a determined brightness level. For example, a device may change the microlens 702 from the first shape (FIG. 7A) to the second shape (FIG. 7B) based on the device determining a brightness level. In some embodiments, the device increases a size of a microlens 702 to increase a brightness level associated with a region of a scene and the device decreases a size of the microlens 702 to decrease a brightness level associated with a region of a scene. In some embodiments, a device changes the shape of the microlens 702 based on an input from a user.

Figure 7C:
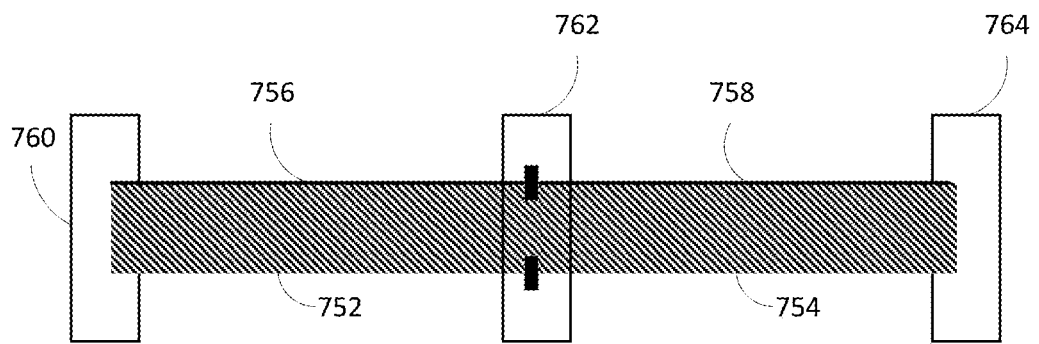
Figure 7D:
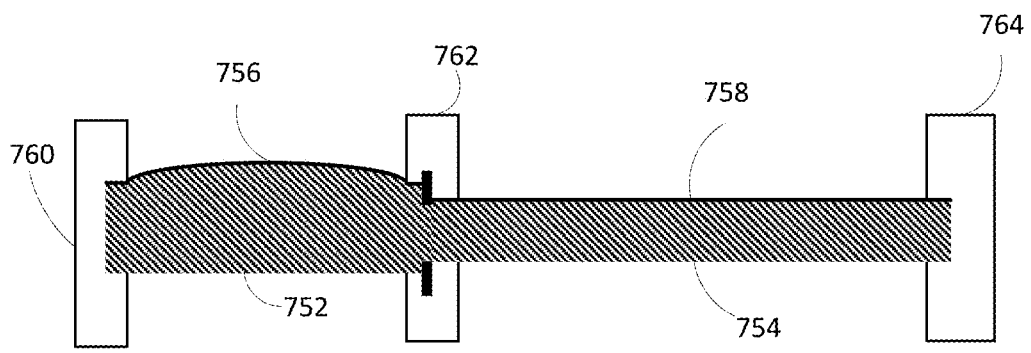

FIGS. 7C and 7D display a first microlens 752 with a first top surface 756 and a second microlens 754 with a second top surface 758. In some embodiments, the first microlens 752 and second microlens 754 are liquid lenses. The first microlens 752 may be couple to a first structure 760 and a second structure 762 and the second microlens 752 may be coupled to the second structure 762 and a third structure 764. Although two microlenses are shown, any number of microlenses may be used.

FIG. 7C displays the first microlens 752 in a first shape and the second microlens 754 in a second shape. FIG. 7D displays the first microlens 752 in a third shape and the second microlens 754 in a fourth shape. In some embodiments, a device changes the shapes of the first microlens 752 and the second microlens 754 by changing the position of the second structure 762. In some embodiments, when the second structure 762 moves, the first microlens 752 is compressed and the first top surface 756 becomes more convex. As the second structure 762 moves, the second microlens 754 may be stretched. In some embodiments, other methodologies may be used to change the shapes of the microlenses. For example, a device may change the shape of the microlenses using electrowetting, shape-changing polymers, acusto-optical tuning, and/or similar such methodologies. In some embodiments, the shape of the first microlens 752 and the second microlens 754 changes based on a determined brightness level. For example, a device may change the first microlens 752 from the first shape (FIG. 7C) to the third shape (FIG. 7D) based on determining that the brightness level for a region of a scene is above a first threshold. The device may also change the second microlens 754 from the second shape (FIG. 7C) to the fourth shape (FIG. 7D) based on determining that the brightness level for a region of a scene is below a second threshold. In some embodiments, a device changes the shapes of the first microlens 752 and the second microlens 754 based on an input from a user.

Figure 8:
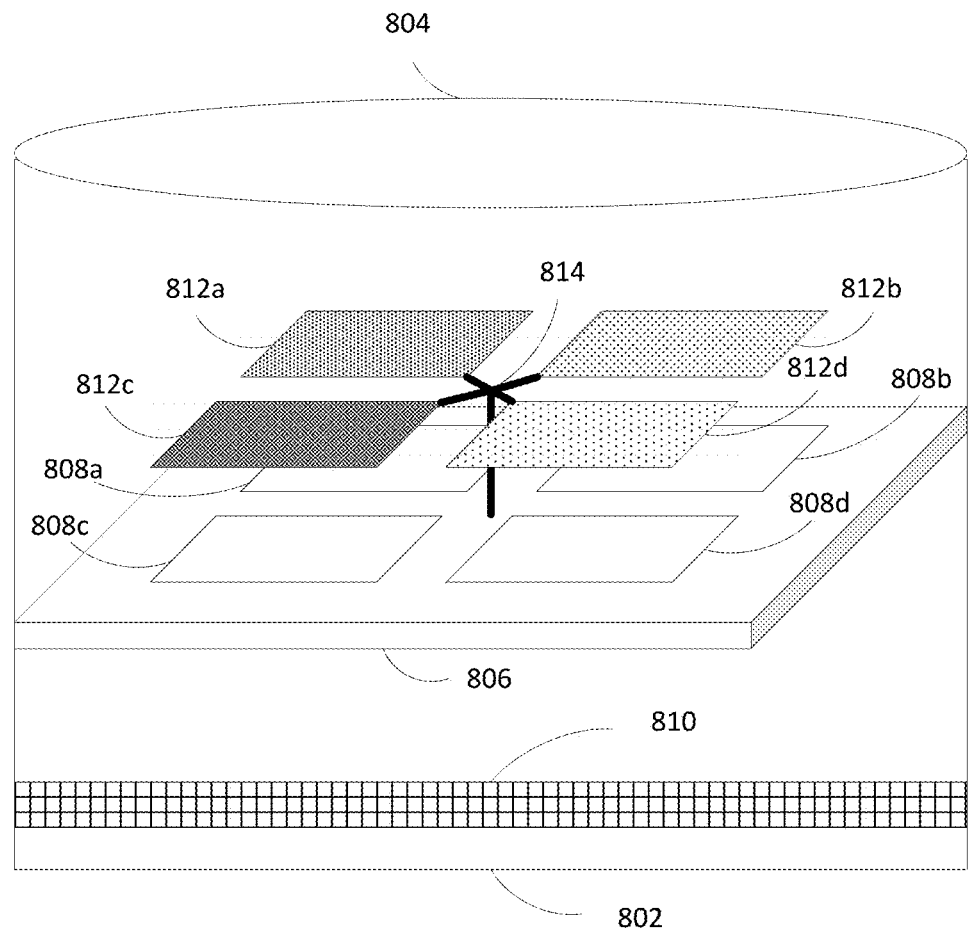
FIG. 8 shows an illustrative diagram of a device with a rotating filter, in accordance with embodiments of the disclosure.

FIG. 8 shows an illustrative diagram of a device 802 with rotating or moveable filters, in accordance with embodiments of the disclosure. In some embodiments, the device 802 comprising a main lens 804, a plurality of microlenses 808a-808d, a photosensor array 810, and a plurality of filters 812a-812d. In some embodiments, the plurality of microlenses 808a-808d are coupled to a platform 806. In some embodiments, the plurality of filters 812a-812d are coupled to a member 814. Although only four microlenses are shown, any number of microlenses may be housed within the device 802. In some embodiments, additional microlenses may not have a filter between the additional microlenses and the main lens 804. In some embodiments, the device 802 may be a camera (e.g., light field camera). In some embodiments, not all components of the device 802 are shown to avoid overcomplicating the drawing.

As illustrated in FIG. 8, at a first set of positions, the first filter 812a is between the first microlens 808a and the main lens 804, the second filter 812b is between the second microlens 808b and the main lens 804, the third filter 812c is between the third microlens 808c and the main lens 804, and the fourth filter 808d is between the fourth microlens 808d and the main lens 804. A first light field image may be generated using the information captured using the plurality of microlenses 808a-808d with the filters 812a-812d at the first set of positions. The device 802 is further configured to rotate or move the member 814 so that each filter is positioned between a different microlens and the main lens. For example, at a second set of positions, the first filter 812a may be between the second microlens 808b and the main lens 804, the second filter 812b may between the third microlens 808c and the main lens 804, the third filter 812c may be between the fourth microlens 808d and the main lens 804, and the fourth filter 808d may be between the first microlens 808a and the main lens 804. In some embodiments, a second light field image is generated using the information captured using the plurality of microlenses 808a-808d with the new filter orientation. In some embodiments, the first light field image and the second light field image have different dynamic ranges due to the different orientation of the plurality of filters 812a-812d. In some embodiments, the first light field image and the second light filed image are combined to create a single HDR image.

Additional light field images may be generated as the member 814 rotates or moves the plurality of filters 812a-812d. In some embodiments, additional light field images are used to further increase the dynamic range of an HDR image. In some embodiments, different types of filters may be used to capture not only HDR images and videos, but also multi-spectral images and videos. In some embodiments, the plurality of microlenses 808a-808d may vary in shape and position. For example, the first microlens 808a may be larger than the second microlens 808b. In another example, the third microlens 808c may be closer to the main lens 804 than the first microlens 808a. In some embodiments, one or more of the plurality of microlenses 808a-808d change position and/or shape as the filter orientation changes. For example, a first light field image may be generated using a first filter orientation where the first microlens 808a is a first shape and a second light field image may be generated using a second filter orientation where the first microlens 808a is a second shape. In another example, a first light field image may be generated using a first filter orientation where the second microlens 808b is in a first position and a second light field image may be generated using a second filter orientation where the second microlens 808b is in a second position (e.g., different plane).

Figure 9:
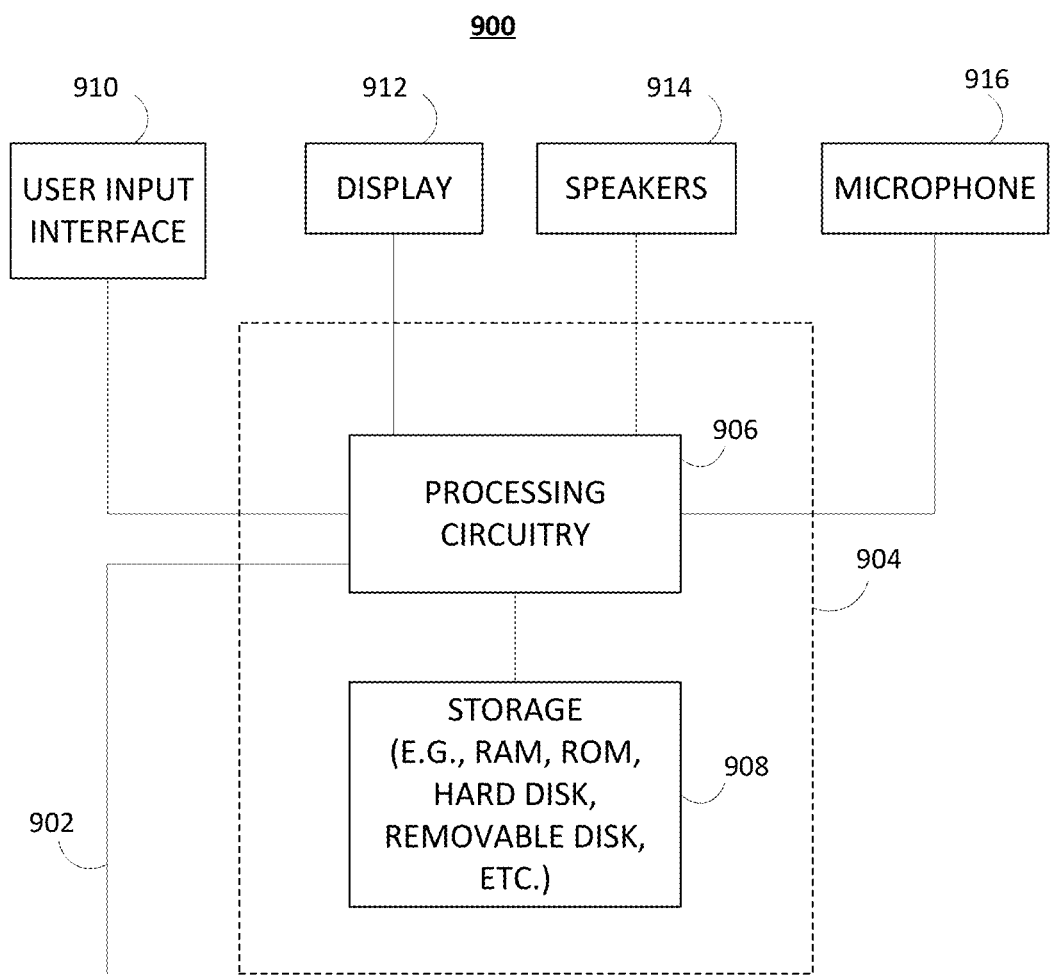
FIG. 9 shows an illustrative block diagram of a device system, in accordance with embodiments of the disclosure.

FIG. 9 shows a generalized embodiment of a user equipment device 900, in accordance with one embodiment. In an embodiment, the user equipment device 900 is the same user device 402 of FIG. 4. The user equipment device 900 may receive content and data via input/output (I/O) path 902. The I/O path 902 may provide audio content (e.g., broadcast programming, on-demand programming, Internet content, content available over a local area network (LAN) or wide area network (WAN), and/or other content) and data to control circuitry 904, which includes processing circuitry 506 and a storage 908. The control circuitry 904 may be used to send and receive commands, requests, and other suitable data using the I/O path 902. The I/O path 902 may connect the control circuitry 904 (and specifically the processing circuitry 906) to one or more communications paths. I/O functions may be provided by one or more of these communications paths but are shown as a single path in FIG. 9 to avoid overcomplicating the drawing.

The control circuitry 904 may be based on any suitable processing circuitry such as the processing circuitry 906. As referred to herein, processing circuitry 906 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The changing of the position and/or shape of a microlens functionality can be at least partially implemented using the control circuitry 504. The changing of the position and/or shape of a microlens functionality described herein may be implemented in or supported by any suitable software, hardware, or combination thereof. The changing of the position and/or shape of a microlens functionality can be implemented on user equipment, on remote servers, or across both.

In client/server-based embodiments, the control circuitry 904 may include communications circuitry suitable for communicating with one or more servers that may at least implement the described changing of the position and/or shape of a microlens functionality. The instructions for carrying out the above-mentioned functionality may be stored on the one or more servers. Communications circuitry may include a cable modem, an integrated service digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 908 that is part of the control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid-state devices, quantum storage devices, gaming consoles, gaming media, or any other suitable fixed or removable storage devices, and/or any combination of the same. The storage 908 may be used to store various types of content described herein. Nonvolatile memory may also be used (e.g., to launch a boot-up routine and other instructions). In some embodiments, cloud-based storage may be used to supplement the storage 908 or instead of the storage 908.

The control circuitry 904 may include audio generating circuitry and tuning circuitry, such as one or more analog tuners, audio generation circuitry, filters or any other suitable tuning or audio circuits or combinations of such circuits. The control circuitry 904 may also include scaler circuitry for upconverting and down converting content into the preferred output format of the user equipment device 900. The control circuitry 904 may also include digital-to-analog converter circuitry and analog-to-digital converter circuitry for converting between digital and analog signals. The tuning and encoding circuitry may be used by the user equipment device 900 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 908 is provided as a separate device from the user equipment device 900, the tuning and encoding circuitry (including multiple tuners) may be associated with the storage 908.

The user may utter instructions to the control circuitry 904, which are received by the microphone 916. The microphone 916 may be any microphone (or microphones) capable of detecting human speech. The microphone 916 is connected to the processing circuitry 906 to transmit detected voice commands and other speech thereto for processing.

The user equipment device 900 may optionally include an interface 910. The interface 910 may be any suitable user interface, such as a remote control, mouse, trackball, keypad, keyboard, touchscreen, touchpad, stylus input, joystick, or other user input interfaces. A display 912 may be provided as a stand-alone device or integrated with other elements of the user equipment device 900. For example, the display 912 may be a touchscreen or touch-sensitive display. In such circumstances, the interface 910 may be integrated with or combined with the microphone 916. When the interface 910 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 910 may be HDTV-capable. In some embodiments, the display 912 may be a 9D display. The speaker (or speakers) 914 may be provided as integrated with other elements of user equipment device 900 or may be a stand-alone unit.

FIG. 10 is an illustrative flowchart of a process 1000 for generating a light field image using microlenses on different planes, in accordance with embodiments of the disclosure. Process 1000, and any of the following processes, may be executed by control circuitry 904 on a user equipment device 900. In some embodiments, control circuitry 904 may be part of a remote server separated from the user equipment device 900 by way of a communications network or distributed over a combination of both. In some embodiments, instructions for executing process 1000 may be encoded onto a non-transitory storage medium (e.g., the storage 908) as a set of instructions to be decoded and executed by processing circuitry (e.g., the processing circuitry 906). Processing circuitry may, in turn, provide instructions to other sub-circuits contained within control circuitry 904, such as the encoding, decoding, encrypting, decrypting, scaling, analog/digital conversion circuitry, and the like. It should be noted that the process 1000, or any step thereof, could be performed on, or provided by, any of the devices shown in FIGS. 1A-9. Although the process 1000, and any of the following processes, are illustrated and described as a sequence of steps, it is contemplated that various embodiments of processes may be performed in any order or combination and need not include all the illustrated steps.

At 1002, control circuitry determines a plurality of focus measurements for a plurality of microlenses, wherein a first microlens of the plurality of microlenses is a first vertical distance from a second microlens of the plurality of microlenses. In some embodiments, the first microlens is on a first plane (e.g., a first distance from a main lens) and the second microlens is on a second plane (e.g., a second distance from the main lens) and the first vertical distance corresponds to the vertical distance between the first plane and the second plane. In some embodiments, the control circuitry uses the plurality of microlenses to capture information comprising focus measurements. For example, each microlens of the plurality of microlenses may capture information relating to a region of the image. The control circuitry can then use one or more algorithms and/or operators to determine focus measurements related to the captured information. For example, the control circuitry may use gradient-based operators, Laplacian-based operators, wavelet-based operators, statistics-based operators, discrete cosine transform (DCT)-based operators, and/or similar such operators to determine focus measurements related to the information captured using each microlens of the plurality of microlenses. In some embodiments, image sharpness may be measured to determine which of the microlenses are used to capture information that is the most in focus. For example, a first portion of an image may be generated or partially generated using the information captured using the first microlens 108a. The device 102 may determine the image sharpness using the rise distance of a tone or color edge of an object portrayed in the portion of the image. The rise distance may correspond to the distance (in pixels, millimeters, or fraction of image height) for the pixel level to go from 10% to 90% of its final value. In another example, a first portion of an image may be generated or partially generated using the information captured using the first microlens 108a. The device 102 may determine the image sharpness using frequency measurements. Frequency measurements may measure in cycles per distance and/or line pairs per distance, where the distance may be millimeters, inches, pixels, and/or image height. For example, line pairs per millimeter (lp/mm), Cycles per pixel (C/P), and/or line width per picture height (LW/PH) may be measured. The control circuitry may determine the plurality of focus measurements in response to a user input. For example, a user may input a command using an interface, wherein the command requests the control circuitry to generate a light field image.

At 1004, control circuitry identifies a first focus measurement of the plurality of focus measurements, wherein the first focus measurement corresponds to the first microlens. In some embodiments, the control circuitry determines that the first focus measurement corresponds to the microlens that is used to capture the information that is the most focused for a region of a scene. For example, the control circuitry may use one or more algorithms and/or operators to determine focus measurements for a region of the scene for each microlens of the plurality of microlenses and then select the microlens with the best focus measurement.

At 1006, control circuitry determines a first defocus function for the second microlens based on the first vertical distance between the first microlens and the second microlens. For example, if the first microlens is used to capture information that is the most focused, a defocus function can be determined for the second microlens based on the distance between the first microlens and the second microlens. In some embodiments, a defocus function is determined for each microlens of the plurality of microlenses that is not the most focused. For example, if the first microlens captures information that is the most focused, a second defocus function can be determined for a third microlens based on the distance between the first microlens and the third microlens.

In some embodiments, the defocus function may correspond to a Point Spread Function (PSF). In some embodiments, one or more PSF models may be used as a defocus function. For example, the defocus function may correspond to a Gaussian PSF model, given by:

$$h(s, t, x, y) = \frac{1}{2\pi\sigma_{xy}^2} e\left(\frac{-(s^2 + t^2)}{2\sigma_{xy}^2}\right)$$

At 1008, control circuitry generates a light field image using the first microlens, the second microlens, and the first defocus function. In some embodiments, a restoration operation is determined using the first defocus function. For example, the inverse of the defocus function may be the restoration operation. In some embodiments, the restoration operation is performed using fast frequency domain transformations (e.g., a Fast Fourier Transform (FFT) algorithm). For example, the restoration operation may correspond to a Constrained Least Squares (CLS) model as shown below:

$$R_{CLS}(u, v) = \frac{H^*(u, v)}{|H(u, v)|^2 + \lambda |C(u, v)|^2}$$

In some embodiments, the CLS model is used to restore various regions of an image in an adaptive manner. In some embodiments, the determined restoration operation is applied to the information captured using the second microlens. In some embodiments, a restoration operation is determined for each microlens of the plurality of microlenses that is not the most focused. For example, a second restoration operation can be applied to information captured using a third microlens, wherein the second restoration operation is determined using a second defocus function.

In some embodiments, the control circuitry performs an adaptive image restoration process (e.g., FFT) to adjust the focus of the information captured by the first and/or second microlens in a frequency domain. In some embodiments, convolution computing the defocus function in the spatial domain can be represented by a product in the frequency domain. Accordingly, the control circuitry can restore a defocused image using computation of two frequency domain transforms (one point-by-point multiplication of two transforms). The systems and methods described herein can significantly reduce the amount of computational time that was traditional required to generate light field images.

Figure 11:
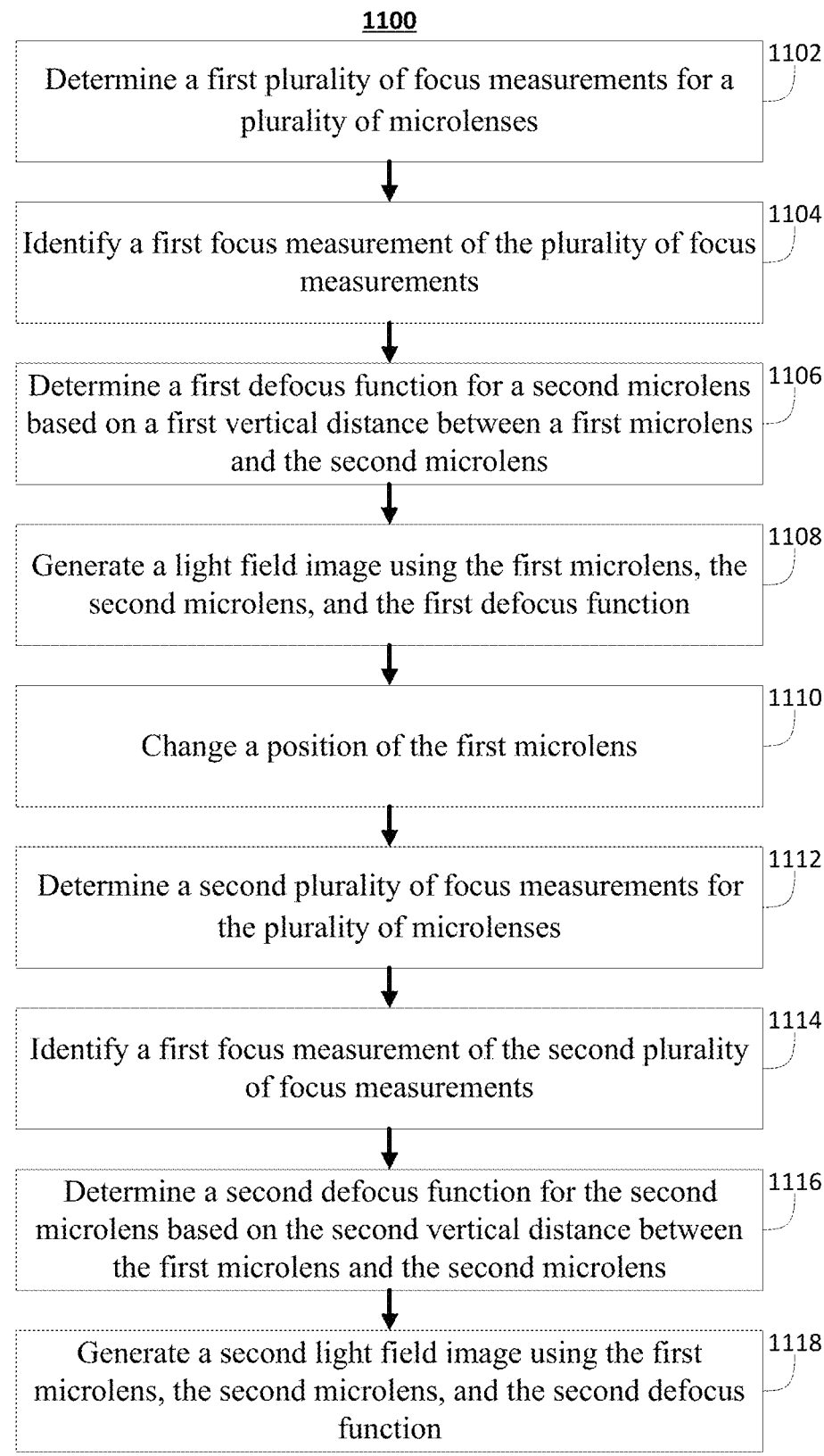
FIG. 11 is another illustrative flowchart of a process for generating a light field image using microlenses on different planes, in accordance with embodiments of the disclosure.

FIG. 11 is another illustrative flowchart of a process 1100 for generating a light field image using microlenses on different planes, in accordance with embodiments of the disclosure.

At 1102, control circuitry determines a first plurality of focus measurements for a plurality of microlenses. In some embodiments, step 1102 uses the same or similar methodologies described in step 1002 above.

At 1104, control circuitry identifies a first focus measurement of the plurality of focus measurements. In some embodiments, step 1104 uses the same or similar methodologies described in step 1004 above.

At 1106, control circuitry determines a first defocus function for a second microlens based on a first vertical distance between a first microlens and the second microlens. In some embodiments, step 1106 uses the same or similar methodologies described in step 1006 above.

At 1108, control circuitry generates a light field image using the first microlens, the second microlens, and the first defocus function. In some embodiments, step 1108 uses the same or similar methodologies described in step 1008 above.

At 1110, control circuitry changes a position of the first microlens. In some embodiments, the control circuitry changes the position of the first microlens based on information captured using the first microlens. For example, the first microlens may capture information used to generate the first light field image from a first position. In some embodiments, the control circuitry calculates a second position for the first microlens using the information captured using the first microlens in the first position. For example, the control circuitry may determine that moving the first microlens to a second position may result in an increased DOF for generated images. In some embodiments, the control circuitry changes the first microlens from a first position to a second position based on an input received by a user. For example, the user may use one or more interfaces input a command and the control circuitry changes the first microlens from a first position to a second position based on the command.

In some embodiments, the control circuitry changes the position of the first microlens using one or more members. For example, one or more members may be coupled to the first microlens and may extend or retract to change the position of the first microlens. In another example, one or more members may slide along a track and/or tilt around an axis to change the position of the first microlens.

At 1112, control circuitry determines a second plurality of focus measurements for the plurality of microlenses. In some embodiments, the control circuitry uses the same or similar methodologies described in step 1102 to capture the second plurality of focus measurements. In some embodiments, one or more of the second plurality of focus measurements are associated with one or more of the plurality of microlenses. For example, a first focus measurement of the second plurality of focus measurements may be associated with the first microlens. In some embodiments, at least one focus measurement associated with a microlens in the first plurality of focus measurements is different than a focus measurement associated with the microlens in the second plurality of focus measurements. For example, a first focus measurement of the first plurality of focus measurements may be captured using the first microlens in the first position. The first microlens may change from the first position to a second position in step 1110. A first focus measurement of the second plurality of focus measurements may then be captured using the first microlens in the second position. Accordingly, the first focus measurement of the first plurality of microlenses may be different than the first focus measurement of the second plurality of microlenses because the first microlens changed to the second position.

In some embodiments, the control circuitry uses information captured the plurality of microlenses to determined focus measurements. For example, each microlens of the plurality of microlenses may capture information relating to a region of the image. The control circuitry can then use one or more algorithms and/or operators to determine focus measurements related to the captured information. For example, the control circuitry may use gradient-based operators, Laplacian-based operators, wavelet-based operators, statistics-based operators, DCT-based operators, and/or similar such operators to determine focus measurements related to the information captured using each microlens of the plurality of microlenses.

At 1114, control circuitry identifies a first focus measurement of the second plurality of focus measurements. In some embodiments, the control circuitry determines that the first focus measurement of the second plurality of focus measurements corresponds to the microlens that captures the information that is the most focused for a region of a scene. For example, the control circuitry may use one or more algorithms and/or operators to determine focus measurements for a region of the scene for each microlens of the plurality of microlens and then select the microlens with the best focus measurement.

At 1116, control circuitry determines a second defocus function for the second microlens based on the second vertical distance between the first microlens and the second microlens. In some embodiments, the second vertical distance between the first microlens and the second microlens is different than the first vertical distance between the first microlens and the second microlens because the control circuitry changed the position of the first microlens at step 1110. In some embodiments, a defocus function is determined for microlenses that are on different planes than the microlens determined to be the most focused. For example, if the first microlens captures information that is the most focused, a second defocus function can be determined for the second microlens based on the second distance between the first microlens and the second microlens. In another example, if the second microlens captures information that is the most focused, a second defocus function can be determined for the first microlens based on the second distance between the first microlens and the second microlens.

At 1118, control circuitry generates a second light field image using the first microlens, the second microlens, and the second defocus function. In some embodiments, a second restoration operation is determined using the second defocus function. For example, the inverse of the second defocus function may be the second restoration operation. The determined second restoration operation can then be applied to the information captured using microlens corresponding to the defocus function. For example, if the second defocus function corresponds to the second microlens then the second restoration operation can be applied to the information captured using the second microlens. In another example, if the second defocus function corresponds to the first microlens then the second restoration operation can be applied to the information captured using the first microlens.

Figure 12:
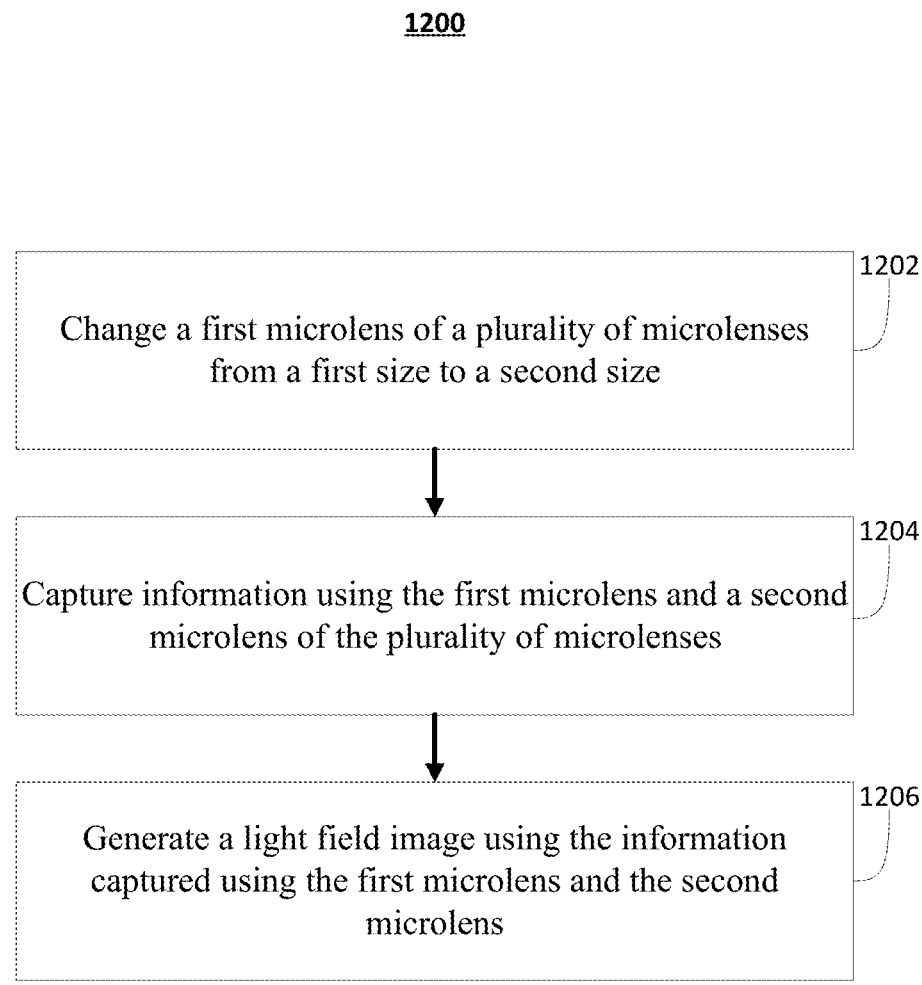
FIG. 12 is an illustrative flowchart of a process for generating a light field image using a device that changes the shape of a microlens, in accordance with embodiments of the disclosure.

FIG. 12 is an illustrative flowchart of a process for generating a light field image using a device that changes the shape of a microlens, in accordance with embodiments of the disclosure.

At 1202, control circuitry changes a first microlens of a plurality of microlenses from a first size to a second size. In some embodiments, the second size is smaller than the first size. In some embodiments, the second size is larger than the first size. In some embodiments, the control circuitry expands or contracts the first microlens to change the shape of the first microlens. For example, the first microlens may be connected to one or more members that expand/or contract the shape of the first microlens. In another example, a pressure of a fluid may be manipulated to expand/or contract the shape of the first microlens. In some embodiments, the control circuitry changes the first microlens from the first size to the second size by applying a force to the microlens. For example, the control circuitry may constrict the first microlens so that the top surface becomes more convex. In some embodiments, the control circuitry changes the size of the first microlens using electrowetting, shape-changing polymers, acusto-optical tuning, and/or similar such methodologies. In some embodiments, one or more filters are used to manipulate the size of the first microlens. For example, a filter may cover a portion of the first microlens so that the size of the first microlens that is used for capturing information changes from a first shape to a second shape.

In some embodiments, the control circuitry changes the size based on one or more factors. For example, the control circuitry may change the size of the first microlens based on a brightness level of a region of a scene. The control circuitry may use information captured using the plurality of microlenses to determine the brightness level of a region of the scene. In some embodiments, the control circuitry changes the shape of the first microlens based on an input from a user. For example, the control circuitry may receive an input when a user interacts with one or more interfaces. The control circuitry may change the first microlens from the first shape to the second shape based on a received input.

At 1204, control circuitry captures information using the first microlens and a second microlens of the plurality of microlenses. In some embodiments, the control circuitry captures the information in response to a user input. For example, a user may press a button corresponding to a "capture" function of the control circuitry. In some embodiments, the information (e.g., photons) from a scene may pass through a main lens and the first microlens, then the information is captured by a photosensor array. Information from the scene may also pass through the main lens and the second microlens before being captured by the photosensor array.

At 1206, control circuitry generates a light field image using the information captured using the first microlens and the second microlens. In some embodiments, the control circuitry generates one or more light field images using the information captured using the first microlens and the second microlens after the first microlens has changed shape. In some embodiments, the control circuitry uses the information captured using the first microlens and the second microlens before that first microlens changed shape in addition to the information captured using the first microlens and the second microlens after the first microlens changed shape. In some embodiments, due to the control circuitry changing the first microlens from the first shape to the second shape, the resulting light field image has increased dynamic range and/or increased resolution. In some embodiments, one or more light field images generated using any of the methodologies described herein may be combined to generate a light field video sequences with increased dynamic range and/or increased resolution.

Figure 13:
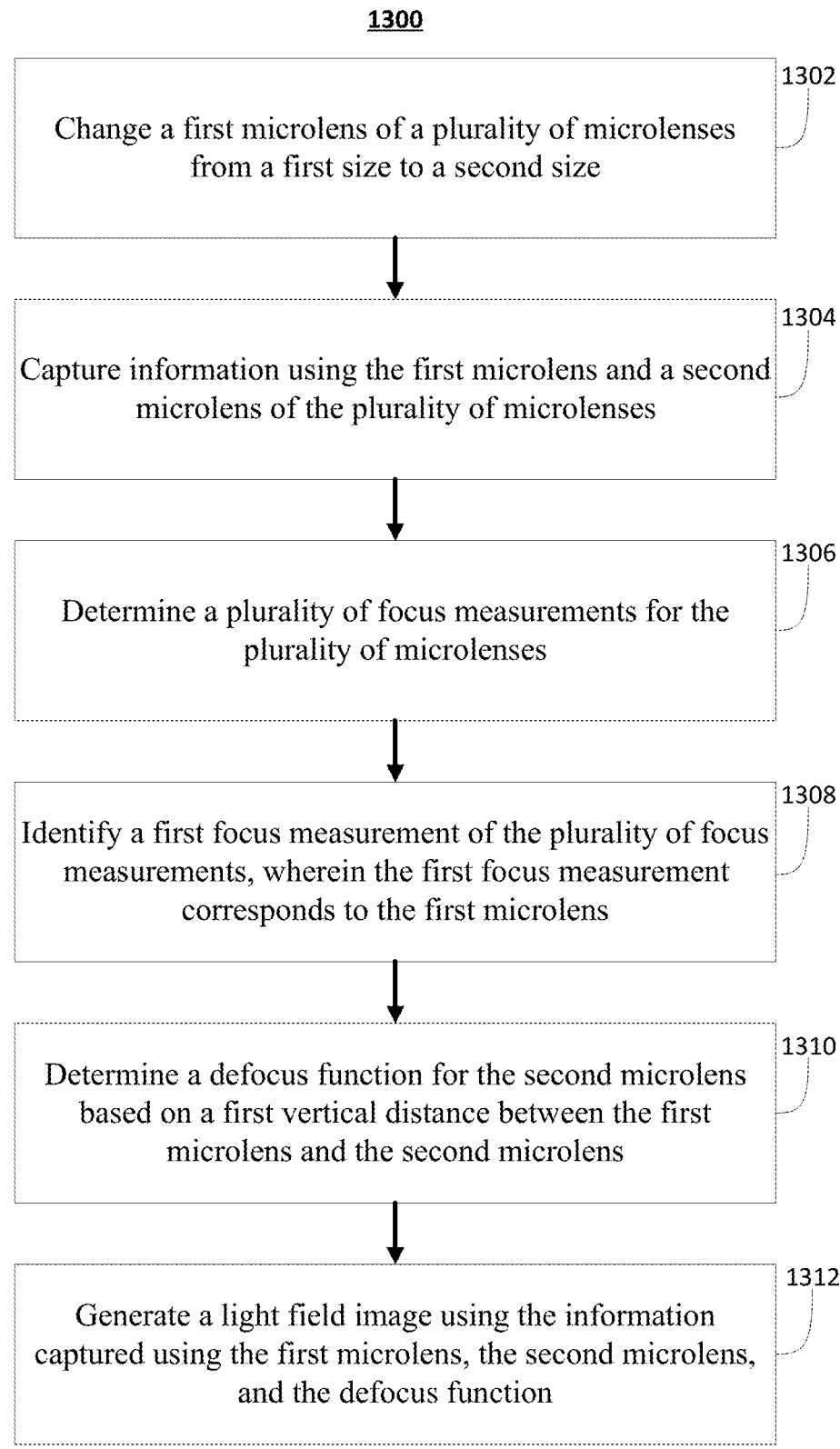
FIG. 13 is another illustrative flowchart of a process for generating a light field image using a device that changes the shape of a microlens, in accordance with embodiments of the disclosure.

FIG. 13 is another illustrative flowchart of a process for generating a light field image using a device that changes the shape of a microlens, in accordance with embodiments of the disclosure.

At 1302, control circuitry changes a first microlens of a plurality of microlenses from a first size to a second size. In some embodiments, step 1302 uses the same or similar methodologies described in step 1202 above.

At 1304, control circuitry captures information using the first microlens and a second microlens of the plurality of microlenses. In some embodiments, step 1304 uses the same or similar methodologies described in step 1204 above.

At 1306, control circuitry determines a plurality of focus measurements for the plurality of microlenses. In some embodiments, the first microlens is on a first plane and a second microlens is on a second plane with a vertical distance between the first plane and the second plane. In some embodiments, the first microlens and a second microlens are on the first plane and a third microlens is on a second plane with a vertical distance between the first plane and the second plane. In some embodiments, the control circuitry uses the plurality of microlenses to capture information comprising focus measurements. For example, each microlens of the plurality of microlenses may capture information relating to a region of the image. The control circuitry can then use one or more algorithms and/or operators to determine focus measurements related to the captured information. For example, the control circuitry may use gradient-based operators, Laplacian-based operators, wavelet-based operators, statistics-based operators, DCT-based operators, and/or similar such operators to determine focus measurements related to the information captured using each microlens of the plurality of microlenses. The control circuitry may determine the plurality of focus measurements in response to a user input. For example, a user may input a command using an interface, wherein the command requests the control circuitry to generate a light field image.

At 1308, control circuitry identifies a first focus measurement of the plurality of focus measurements, wherein the first focus measurement corresponds to the first microlens. In some embodiments, the control circuitry determines that the first focus measurement corresponds to the microlens that captures the information that is the most focused for a region of a scene. For example, the control circuitry may use one or more algorithms and/or operators to determine focus measurements for a region of the scene for each microlens of the plurality of microlenses and then select the microlens with the best focus measurement. In some embodiments, a third microlens (e.g., a microlens that did not change sizes) is determined to capture information that is the most in focus.

At 1310, control circuitry determines a defocus function for the second microlens based on a first vertical distance between the first microlens and the second microlens. For example, if the first microlens captures information that is the most focused, a defocus function can be determined for the second microlens based on the distance between the first microlens and the second microlens. In some embodiments, a defocus function is determined for each microlens of the plurality of microlenses that is not the most focused. For example, if the first microlens captures information that is the most focused, a second defocus function can be determined for a third microlens based on the distance between the first microlens and the third microlens. In another example, if the second microlens captures information that is the most focused, a defocus function can be determined for the first microlens based on the distance between the first microlens and the second microlens. In some embodiments, differences in the size/shape of microlenses are also used to determine a defocus function. For example, the control circuitry may use the vertical distance between the first microlens and second lens in additional to a difference in shape/size of the first microlens and second microlens to determine the defocus operation.

At 1312, control circuitry generates a light field image using the information captured using the first microlens, the second microlens, and the defocus function. In some embodiments, a restoration operation is determined using the defocus function. For example, the inverse of the defocus function may be the restoration operation. The determined restoration operation can then be applied to the information captured using the second microlens. In some embodiments, a restoration operation is determined for each microlens of the plurality of microlenses that is not the most focused. For example, a second restoration operation can be applied to information captured using a third microlens, wherein the second restoration operation is determined using a second defocus function. In some embodiments, differences in the size/shape of microlenses are also used to determine a restoration operation. For example, the control circuitry may use the vertical distance between the first microlens and second microlens in additional to a difference in shape/size of the first microlens and second microlens to determine the restoration operation.

FIG. 14 is an illustrative flowchart of a process for generating a light field image using a device with a rotating filter, in accordance with embodiments of the disclosure.

At 1402, control circuitry captures a first image using a plurality of microlenses and a plurality of filters, wherein a first filter of the plurality of filters is between a main lens and a first microlens of the plurality of microlenses. In some embodiments, the control circuitry captures the information in response to a user input. For example, a user may press a button corresponding to a "capture" function of the control circuitry. In some embodiments, the control circuitry captures the first image by capturing information (e.g., photons) from a scene that passes through a main lens, then through one or more microlenses of the plurality of microlenses, and then is captured by a photosensor array. In some embodiments, the information also passes through one or more filters. For example, a first filter may be located between the first microlens and the main lens. In another example, the first filter may be located between the first microlens and the photosensor array. In some embodiments, the plurality of filters are only between a subset of the plurality of microlenses and the main lens. For example, there may be 20 microlenses and only four of the microlenses may have filters between the microlenses and the main lens. In some embodiments, the control circuitry uses the information to generate an image. In some embodiments, the first image is a light field image.

At 1404, control circuitry rotates or otherwise changes positions of the plurality filters with respect to the microlenses. In some embodiments, the control circuitry rotates the plurality of filters using a member. In some embodiments, the control circuitry rotates the plurality of filters so that one or more of the plurality of filters is between a different microlens and the main lens compared to when the first image was captured in step 1402. For example, the control circuitry may rotate the plurality of filters so that the first filter is no longer between the first microlens and the main lens.

At 1406, control circuitry captures a second image using the plurality of microlenses and the plurality of filters, wherein a second filter of the plurality of filters is between the main lens and the first microlens of the plurality of microlenses. In some embodiments, the control circuitry uses the same or similar methodologies as described in step 1402 to capture the second image. In some embodiments, the second image is different than the first image because the second filter is between the first microlens and the main lens. In some embodiments, the second image is a light field image.

At 1408, control circuitry generates a light field image using the first image and the second image. In some embodiments, the first image and the second image have different dynamic ranges due to the different orientation of the plurality of filters. In some embodiments, the first image and the second image are combined to create a single HDR image. In some embodiments, additional images may be generated as the control circuitry rotates the plurality of filters. In some embodiments, additional images are used to further increase the dynamic range of an HDR image. In some embodiments, different types of filters may be used to capture not only HDR images and videos, but also multi-spectral images and videos. In some embodiments, the plurality of microlenses vary in shape and position. For example, the first microlens may be larger than a second microlens. In another example, the first microlens may be closer to the main lens than the second microlens. In some embodiments, one or more of the plurality of microlenses change position and/or shape as the filter orientation changes. For example, a first image may be generated using a first filter orientation where the first microlens is a first shape and a second image is generated using a second filter orientation where the first microlens is a second shape. In another example, a first image is generated using a first filter orientation where the first microlens is in a first position and a second image is generated using a second filter orientation where the first microlens is in a second position (e.g., different plane).

It is contemplated that some suitable steps or suitable descriptions of FIGS. 10-14 may be used with other suitable embodiments of this disclosure. In addition, some suitable steps and descriptions described in relation to FIGS. 10-14 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1-9 could be used to perform one or more of the steps in FIGS. 10-14.

The processes discussed above are intended to be illustrative and not limiting. For instance, the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:
1. A method comprising:
    determining a plurality of focus measurements for a plurality of microlenses, wherein a first microlens of the plurality of microlenses is a first vertical distance from a second microlens of the plurality of microlenses;

identifying a first focus measurement of the plurality of focus measurements, wherein the first focus measurement corresponds to the first microlens;

determining a first defocus function for the second microlens based on the first vertical distance between the first microlens and the second microlens; and generating a light field image using the first microlens, the second microlens, and the first defocus function.

2. The method of claim 1, further comprising identifying a restoration operation using the defocus function.

3. The method of claim 2, wherein the light field image is generated by applying the restoration operation to information captured using the second microlens.

4. The method of claim 3, wherein the restoration operation is performed in a frequency domain.

5. The method of claim 3, wherein generating the light field image further comprises expanding a depth of field of the light field image using the restoration operation.

6. The method of claim 5, wherein expanding the depth of field is performed while a plurality of images are captured using the first microlens and the second microlens.

7. The method of claim 6, wherein expanding the depth of field is performed without stereo matching.

8. The method of claim 1, further comprising:

generating a plurality of light field image using the first microlens, the second microlens, and the defocus function; and generating a light field video using the plurality of light field images.

9. The method of claim 1, further comprising:

changing a position of the first microlens so that the first microlens is a second vertical distance from the second microlens;

determining a second plurality of focus measurements for the plurality of microlenses, wherein the first microlens is the second vertical distance from the second microlens;

identifying a second focus measurement of the second plurality of focus measurements, wherein the second focus measurement of the second plurality of focus measurements corresponds to the first microlens at the second vertical distance from the second microlens;

determining a second defocus function for the second microlens based on the second vertical distance between the first microlens and the second microlens; and generating a second light field image using the first microlens, the second microlens, and the second defocus function.

10. The method of claim 9, wherein the position of the first microlens is changed manually.

11. The method of claim 9, wherein the position of the first microlens is changed automatically.

12. The method of claim 9, wherein the first vertical distance is less than the second vertical distance.

13. The method of claim 9, wherein the first vertical distance is more than the second vertical distance.

14. An apparatus, comprising:

control circuitry; and at least one memory including computer program code for one or more programs, the at least one memory and the computer program code configured to, with the control circuitry, cause the apparatus to perform at least the following:

determine a plurality of focus measurements for a plurality of microlenses, wherein a first microlens of the plurality of microlenses is a first vertical distance from a second microlens of the plurality of microlenses;

identify a first focus measurement of the plurality of focus measurements, wherein the first focus measurement corresponds to the first microlens;

determine a first defocus function for the second microlens based on the first vertical distance between the first microlens and the second microlens; and generate a light field image using the first microlens, the second microlens, and the first defocus function.

15. The apparatus of claim 14, wherein the apparatus is further caused to identify a restoration operation using the defocus function.

16. The apparatus of claim 15, wherein the light field image is generated by applying the restoration operation to information captured using the second microlens.

17. The apparatus of claim 16, wherein the restoration operation is performed in a frequency domain.

18. The apparatus of claim 16, wherein the apparatus is further caused, when generating the light field image, to expand a depth of field of the light field image using the restoration operation.

19. The apparatus of claim 18, wherein the apparatus is caused to expand the depth of field while a plurality of images are captured using the first microlens and the second microlens.

20. A non-transitory computer-readable medium having instructions encoded thereon that, when executed by control circuitry, cause the control circuitry to:

determine a plurality of focus measurements for a plurality of microlenses, wherein a first microlens of the plurality of microlenses is a first vertical distance from a second microlens of the plurality of microlenses;

identify a first focus measurement of the plurality of focus measurements, wherein the first focus measurement corresponds to the first microlens;

determine a first defocus function for the second microlens based on the first vertical distance between the first microlens and the second microlens; and generate a light field image using the first microlens, the second microlens, and the first defocus function.

* * * * *